US012460754B2

(12) United States Patent
Bories et al.

(10) Patent No.: US 12,460,754 B2
(45) Date of Patent: Nov. 4, 2025

(54) CLAMP-TO-FASTLOCK CONVERTER

(71) Applicant: Schlumberger Technology Corporation, Sugar Land, TX (US)

(72) Inventors: Sebastien Bories, Beziers (FR); David Sanchez, Beziers (FR); Jérome Proust, Beziers (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/253,533

(22) PCT Filed: Nov. 22, 2021

(86) PCT No.: PCT/US2021/072542
§ 371 (c)(1),
(2) Date: May 18, 2023

(87) PCT Pub. No.: WO2022/109614
PCT Pub. Date: May 27, 2022

(65) Prior Publication Data
US 2024/0011585 A1 Jan. 11, 2024

Related U.S. Application Data

(60) Provisional application No. 63/198,885, filed on Nov. 20, 2020, provisional application No. 63/198,886, filed on Nov. 20, 2020.

(51) Int. Cl.
*F16L 23/04* (2006.01)
*E21B 17/02* (2006.01)
(52) U.S. Cl.
CPC .............. *F16L 23/04* (2013.01); *E21B 17/02* (2013.01)

(58) Field of Classification Search
CPC ......... F16L 23/04; F16L 25/06; F16L 25/065; F16L 25/08
See application file for complete search history.

(56) References Cited

U.S. PATENT DOCUMENTS 3,437,230 A * 4/1969 Savory ..................... F16J 10/02
220/327
4,416,575 A * 11/1983 McCarthy ........... F16L 19/0231
403/336

(Continued)

FOREIGN PATENT DOCUMENTS

EP 543127 A1 * 5/1993 ............ F16L 25/065
GB 166718 A * 7/1921

OTHER PUBLICATIONS

Translation of GB-166718-A (Year: 1921).*

(Continued)

*Primary Examiner* — Zachary T Dragicevich
*Assistant Examiner* — Alexander T Rufrano
(74) *Attorney, Agent, or Firm* — Jeffrey D. Frantz

(57) ABSTRACT

A clamp for coupling two tubular members together includes an annular body. The clamp also includes a plurality of fixed segments that are configured to be secured at least partially within a recess formed in an inner surface of the body. The fixed segments are circumferentially offset from one another with respect to a central longitudinal axis through the body. The fixed segments are configured to exert a downward force on a first hub of a first tubular member. The clamp also includes a plurality of clamping segments that extend radially through the body. The clamping segments are circumferentially offset from one another. The clamping segments are axially offset from the fixed segments. The clamping segments are configured to actuate between a retracted position and an extended position. The clamping segments (Continued)

in the extended position are configured to exert an upward force on a second hub of a second tubular.

15 Claims, 14 Drawing Sheets

(56) References Cited

U.S. PATENT DOCUMENTS

| | | | | |
|---|---|---|---|---|
| 4,460,201 A | | 7/1984 | McGugan | |
| 4,627,774 A | * | 12/1986 | Bradley | F16B 31/021 |
| | | | | 411/410 |
| 4,799,714 A | * | 1/1989 | Collet | E21B 33/0422 |
| | | | | 285/308 |
| 4,921,284 A | * | 5/1990 | Singeetham | F16L 23/036 |
| | | | | 285/354 |
| 5,149,143 A | * | 9/1992 | Howell | E21B 33/03 |
| | | | | 285/364 |
| 5,333,911 A | * | 8/1994 | Watkins | E21B 17/0465 |
| | | | | 285/309 |
| 6,739,631 B2 | * | 5/2004 | Smith | F16L 21/08 |
| | | | | 411/4 |
| 7,484,776 B2 | * | 2/2009 | Dallas | F16L 17/08 |
| | | | | 277/602 |
| 8,388,255 B2 | * | 3/2013 | Larson | E21B 19/06 |
| | | | | 403/31 |
| 10,400,925 B2 | * | 9/2019 | Pendleton | F16L 23/08 |
| 2007/0013188 A1 | | 1/2007 | Dallas | |
| 2015/0323109 A1 | | 11/2015 | Dupal | |
| 2017/0292642 A1 | | 10/2017 | Pendleton | |

OTHER PUBLICATIONS

International Preliminary Report on Patentability of International Patent Application No. PCT/US2021/072542 dated Jun. 1, 2023, 8 pages.
Search Report and Written Opinion of International Patent Application No. PCT/US2021/072542 dated Mar. 17, 2022; 11 pages.

* cited by examiner

CLAMP-TO-FASTLOCK CONVERTER

CROSS-REFERENCE TO RELATED APPLICATIONS

This application is a National Stage Entry of PCT Patent Application No. PCT/US2021/072542, filed on Nov. 22, 2021, which claims priority to U.S. Provisional Patent Application No. 63/198,885, filed on Nov. 20, 2020, and U.S. Provisional Patent Application No. 63/198,886, filed on Nov. 20, 2020, the entirety of which is incorporated by reference herein.

BACKGROUND

A hub refers to a portion at an end of a tubular member that has an increased outer diameter. Two tubular members may be connected together by first placing them end-to-end with the hubs axially adjacent to one another. An annular clamp (e.g., an API 16A clamp) may then be placed around the two hubs. The clamp may include two substantially C-shaped members that each extend about 180 degrees around the hubs. Thus, a first circumferential end of the first C-shaped member may be adjacent to a first circumferential end of the second C-shaped member, and a second circumferential end of the first C-shaped member may be adjacent to a second circumferential end of the second C-shaped member.

Each circumferential end may include a protrusion that extends radially outward therefrom such that there are two pairs of adjacent protrusions (e.g., with the two pairs being 180 degrees apart from one another). One or more first bolts may extend through the first pair of adjacent protrusions, and one or more second bolts may extend through the second pair of adjacent protrusions. The bolts may extend substantially tangentially to the C-shaped members. The bolts may be tightened to pull the C-shaped members toward one another, which exerts a radially inward force on the two hubs. This secures the two hubs together. However, handling the C-shape members and the bolts 10 meters above the deck in the field involves safety risks. Also, tightening the bolts involves a large force, which may take a long time. Therefore, what is needed is an improved system and method for connecting two hubs.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments of the disclosure include a clamp for coupling two tubular members together. The clamp includes an annular body. The clamp also includes a plurality of fixed segments that are configured to be secured at least partially within a recess formed in an inner surface of the body. The fixed segments are circumferentially offset from one another with respect to a central longitudinal axis through the body. The fixed segments are configured to exert a downward force on a first hub of a first tubular member. The clamp also includes a plurality of clamping segments that extend radially through the body. The clamping segments are circumferentially offset from one another. The clamping segments are axially offset from the fixed segments. The clamping segments are configured to actuate between a retracted position and an extended position. The clamping segments in the extended position are configured to exert an upward force on a second hub of a second tubular to secure the first and second hubs axially between the fixed segments and the clamping segments.

In another embodiment, the clamp includes an annular body. The clamp also includes a split ring configured to be positioned at least partially within a recess formed in an inner surface of the body. The split ring includes a plurality of fixed segments that are circumferentially offset from one another with respect to a central longitudinal axis through the body. The split ring is configured to exert a downward force on a first hub of a first tubular member. The clamp also includes a plate configured to be positioned above the body, the split ring, or both. The plate is configured to be coupled to the body, the split ring, or both. The plate includes a plurality of portions that are circumferentially offset from one another. The portions of the plate are rotationally offset from the fixed segments. The clamp also includes a plurality of clamping segments that extend radially through the body. The clamping segments are circumferentially offset from one another. The clamping segments are axially offset from the split ring. The clamping segments are configured to actuate between a retracted position and an extended position. The clamping segments in the extended position are configured to exert an upward force on a second hub of a second tubular member to secure the first and second hubs axially between the split ring and the clamping segments.

A method for coupling two tubular members together is also disclosed. The method includes positioning a split ring around a first hub of a first tubular member. The split ring includes a plurality of fixed segments that are circumferentially offset from one another. The method also includes positioning an annular body around the split ring, the first hub, or both. The method also includes securing the fixed segments within the body. The method also includes actuating a plurality of clamping segments into a retracted position. The clamping segments extend radially through the body. The clamping segments are circumferentially offset from one another. The clamping segments are axially offset from the split ring. The method also includes positioning the body around a second hub of a second tubular member. The method also includes actuating the clamping segments into an extended position to contact the second hub, thereby securing the first and second hubs axially between the split ring and the clamping segments.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to specific embodiments illustrated in the accompanying drawings and figures. In the following detailed description, numerous specific details are set forth in order to provide a thorough understanding of the invention. However, it will be apparent to one of ordinary skill in the art that embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object or step, and, similarly, a second object could be termed a first object or step, without departing from the scope of the present disclosure.

The terminology used in the description of the invention herein is for the purpose of describing particular embodiments only and is not intended to be limiting. As used in the description of the invention and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Figure 1:
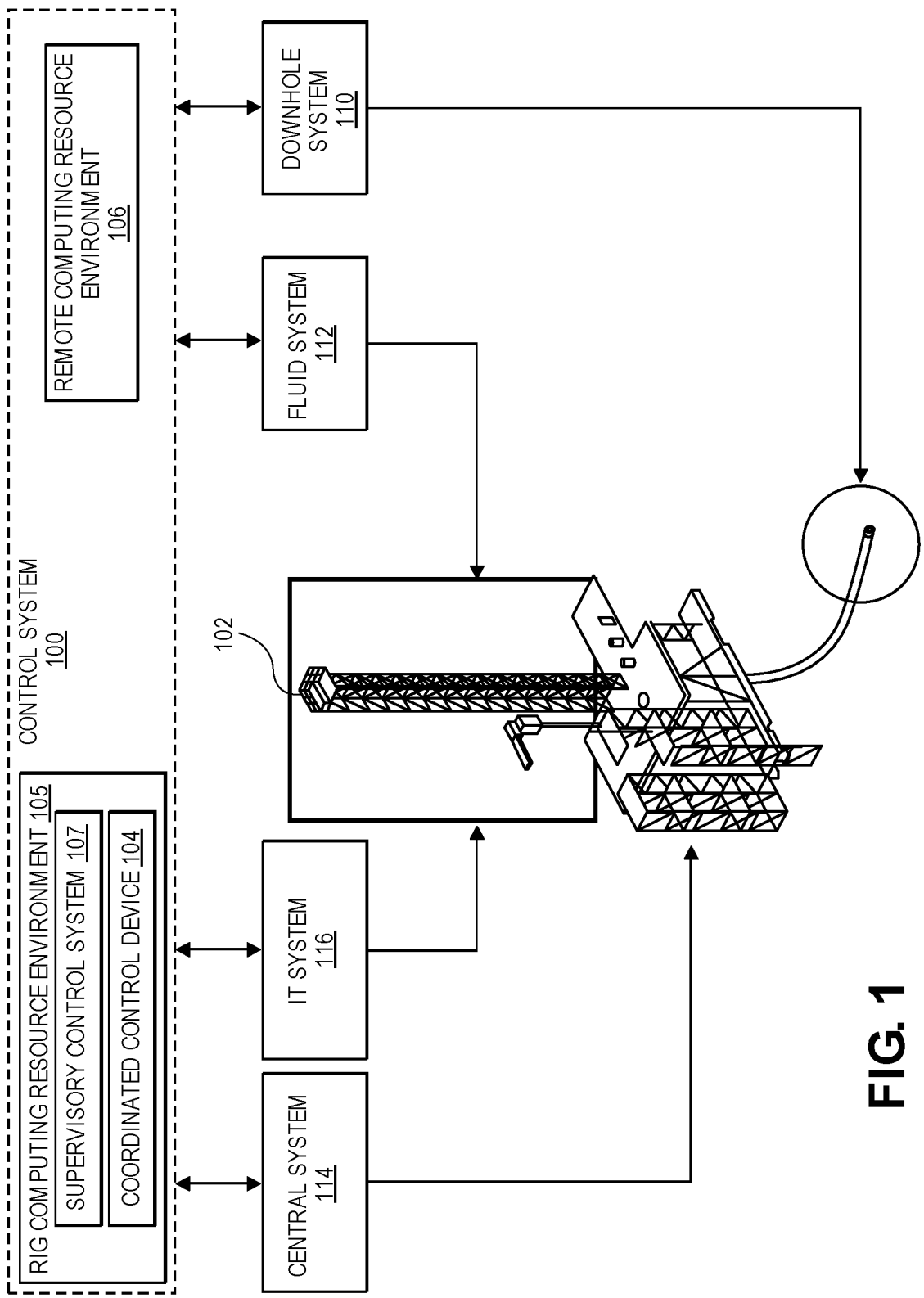
FIG. 1 illustrates a conceptual, schematic view of a control system for a drilling rig, according to an embodiment.

FIG. 1 illustrates a conceptual, schematic view of a control system 100 for a drilling rig 102, according to an embodiment. The control system 100 may include a rig computing resource environment 105, which may be located onsite at the drilling rig 102 and, in some embodiments, may have a coordinated control device 104. The control system 100 may also provide a supervisory control system 107. In some embodiments, the control system 100 may include a remote computing resource environment 106, which may be located offsite from the drilling rig 102.

The remote computing resource environment 106 may include computing resources locating offsite from the drilling rig 102 and accessible over a network. A "cloud" computing environment is one example of a remote computing resource. The cloud computing environment may communicate with the rig computing resource environment 105 via a network connection (e.g., a WAN or LAN connection). In some embodiments, the remote computing resource environment 106 may be at least partially located onsite, e.g., allowing control of various aspects of the drilling rig 102 onsite through the remote computing resource environment 105 (e.g., via mobile devices). Accordingly, "remote" should not be limited to any particular distance away from the drilling rig 102.

Further, the drilling rig 102 may include various systems with different sensors and equipment for performing operations of the drilling rig 102, and may be monitored and controlled via the control system 100, e.g., the rig computing resource environment 105. Additionally, the rig computing resource environment 105 may provide for secured access to rig data to facilitate onsite and offsite user devices monitoring the rig, sending control processes to the rig, and the like.

Various example systems of the drilling rig 102 are depicted in FIG. 1. For example, the drilling rig 102 may include a downhole system 110, a fluid system 112, and a central system 114. These systems 110, 112, 114 may also be examples of "subsystems" of the drilling rig 102, as described herein. In some embodiments, the drilling rig 102 may include an information technology (IT) system 116. The downhole system 110 may include, for example, a bottomhole assembly (BHA), mud motors, sensors, etc. disposed along the drill string, and/or other drilling equipment configured to be deployed into the wellbore. Accordingly, the downhole system 110 may refer to tools disposed in the wellbore, e.g., as part of the drill string used to drill the well.

The fluid system 112 may include, for example, drilling mud, pumps, valves, cement, mud-loading equipment, mud-management equipment, pressure-management equipment, separators, and other fluids equipment. Accordingly, the fluid system 112 may perform fluid operations of the drilling rig 102.

The central system 114 may include a hoisting and rotating platform, top drives, rotary tables, kellys, drawworks, pumps, generators, tubular handling equipment, derricks, masts, substructures, and other suitable equipment. Accordingly, the central system 114 may perform power generation, hoisting, and rotating operations of the drilling rig 102, and serve as a support platform for drilling equipment and staging ground for rig operation, such as connection make up, etc. The IT system 116 may include software, computers, and other IT equipment for implementing IT operations of the drilling rig 102.

The coordinated control device 104 may facilitate control of individual systems (e.g., the central system 114, the downhole system 110, or fluid system 112, etc.) at the level of each individual system. For example, in the fluid system 112, sensor data 142 may be fed into the controller 132, which may respond to control the actuators 130. However, for control operations that involve multiple systems, the control may be coordinated through the coordinated control device 104. Examples of such coordinated control operations include the control of downhole pressure during tripping. The downhole pressure may be affected by both the fluid system 112 (e.g., pump rate and choke position) and the central system 114 (e.g. tripping speed). When it is desired to maintain certain downhole pressure during tripping, the coordinated control device 104 may be used to direct the appropriate control commands. Furthermore, for mode based controllers which employ complex computation to reach a control setpoint, which are typically not implemented in the subsystem PLC controllers due to complexity and high computing power demands, the coordinated control device 104 may provide the adequate computing environment for implementing these controllers.

In some embodiments, one or more of the downhole system 110, fluid system 112, and/or central system 114 may be manufactured and/or operated by different vendors. In such an embodiment, certain systems may not be capable of unified control (e.g., due to different protocols, restrictions on control permissions, safety concerns for different control systems, etc.). An embodiment of the control system 100 that is unified, may, however, provide control over the drilling rig 102 and its related systems (e.g., the downhole system 110, fluid system 112, and/or central system 114, etc.). Further, the downhole system 110 may include one or a plurality of downhole systems. Likewise, fluid system 112, and central system 114 may contain one or a plurality of fluid systems and central systems, respectively.

In addition, the coordinated control device 104 may interact with the user device(s) (e.g., human-machine interface(s)) 118, 120. For example, the coordinated control device 104 may receive commands from the user devices 118, 120 and may execute the commands using two or more of the rig systems 110, 112, 114, e.g., such that the operation of the two or more rig systems 110, 112, 114 act in concert and/or off-design conditions in the rig systems 110, 112, 114 may be avoided.

Figure 2:
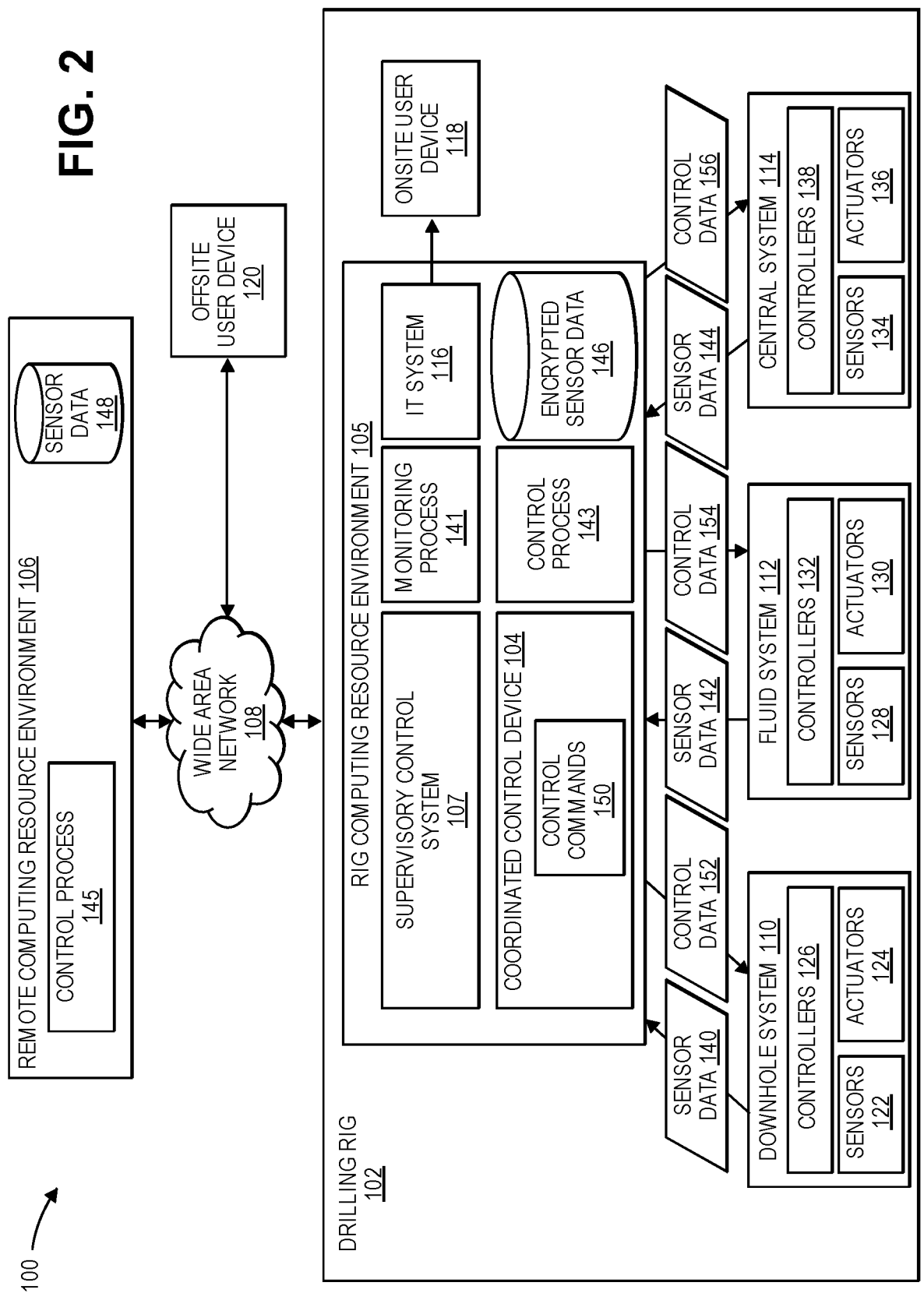
FIG. 2 illustrates a conceptual, schematic view of the control system, according to an embodiment.

FIG. 2 illustrates a conceptual, schematic view of the control system 100, according to an embodiment. The rig computing resource environment 105 may communicate with offsite devices and systems using a network 108 (e.g., a wide area network (WAN) such as the internet). Further, the rig computing resource environment 105 may communicate with the remote computing resource environment 106 via the network 108. FIG. 2 also depicts the aforementioned example systems of the drilling rig 102, such as the downhole system 110, the fluid system 112, the central system 114, and the IT system 116. In some embodiments, one or more onsite user devices 118 may also be included on the drilling rig 102. The onsite user devices 118 may interact with the IT system 116. The onsite user devices 118 may include any number of user devices, for example, stationary user devices intended to be stationed at the drilling rig 102 and/or portable user devices. In some embodiments, the onsite user devices 118 may include a desktop, a laptop, a smartphone, a personal data assistant (PDA), a tablet component, a wearable computer, or other suitable devices. In some embodiments, the onsite user devices 118 may communicate with the rig computing resource environment 105 of the drilling rig 102, the remote computing resource environment 106, or both.

One or more offsite user devices 120 may also be included in the system 100. The offsite user devices 120 may include a desktop, a laptop, a smartphone, a personal data assistant (PDA), a tablet component, a wearable computer, or other suitable devices. The offsite user devices 120 may be configured to receive and/or transmit information (e.g., monitoring functionality) from and/or to the drilling rig 102 via communication with the rig computing resource environment 105. In some embodiments, the offsite user devices 120 may provide control processes for controlling operation of the various systems of the drilling rig 102. In some embodiments, the offsite user devices 120 may communicate with the remote computing resource environment 106 via the network 108.

The user devices 118 and/or 120 may be examples of a human-machine interface. These devices 118, 120 may allow feedback from the various rig subsystems to be displayed and allow commands to be entered by the user. In various embodiments, such human-machine interfaces may be onsite or offsite, or both.

The systems of the drilling rig 102 may include various sensors, actuators, and controllers (e.g., programmable logic controllers (PLCs)), which may provide feedback for use in the rig computing resource environment 105. For example, the downhole system 110 may include sensors 122, actuators 124, and controllers 126. The fluid system 112 may include sensors 128, actuators 130, and controllers 132. Additionally, the central system 114 may include sensors 134, actuators 136, and controllers 138. The sensors 122, 128, and 134 may include any suitable sensors for operation of the drilling rig 102. In some embodiments, the sensors 122, 128, and 134 may include a camera, a pressure sensor, a temperature sensor, a flow rate sensor, a vibration sensor, a current sensor, a voltage sensor, a resistance sensor, a gesture detection sensor or device, a voice actuated or recognition device or sensor, or other suitable sensors.

The sensors described above may provide sensor data feedback to the rig computing resource environment 105 (e.g., to the coordinated control device 104). For example, downhole system sensors 122 may provide sensor data 140, the fluid system sensors 128 may provide sensor data 142, and the central system sensors 134 may provide sensor data 144. The sensor data 140, 142, and 144 may include, for example, equipment operation status (e.g., on or off, up or down, set or release, etc.), drilling parameters (e.g., depth, hook load, torque, etc.), auxiliary parameters (e.g., vibration data of a pump) and other suitable data. In some embodiments, the acquired sensor data may include or be associated with a timestamp (e.g., a date, time or both) indicating when the sensor data was acquired. Further, the sensor data may be aligned with a depth or other drilling parameter.

Acquiring the sensor data into the coordinated control device 104 may facilitate measurement of the same physical properties at different locations of the drilling rig 102. In some embodiments, measurement of the same physical properties may be used for measurement redundancy to enable continued operation of the well. In yet another embodiment, measurements of the same physical properties at different locations may be used for detecting equipment conditions among different physical locations. In yet another embodiment, measurements of the same physical properties using different sensors may provide information about the relative quality of each measurement, resulting in a "higher" quality measurement being used for rig control, and process applications. The variation in measurements at different locations over time may be used to determine equipment performance, system performance, scheduled maintenance due dates, and the like. Furthermore, aggregating sensor data from each subsystem into a centralized environment may enhance drilling process and efficiency. For example, slip status (e.g., in or out) may be acquired from the sensors and provided to the rig computing resource environment 105, which may be used to define a rig state for automated control. In another example, acquisition of fluid samples may be measured by a sensor and related with bit depth and time measured by other sensors. Acquisition of data from a camera sensor may facilitate detection of arrival and/or installation of materials or equipment in the drilling rig 102. The time of arrival and/or installation of materials or equipment may be used to evaluate degradation of a material, scheduled maintenance of equipment, and other evaluations.

The coordinated control device 104 may facilitate control of individual systems (e.g., the central system 114, the downhole system, or fluid system 112, etc.) at the level of each individual system. For example, in the fluid system 112, sensor data 128 may be fed into the controller 132, which may respond to control the actuators 130. However, for control operations that involve multiple systems, the control may be coordinated through the coordinated control device 104. Examples of such coordinated control operations include the control of downhole pressure during tripping. The downhole pressure may be affected by both the fluid system 112 (e.g., pump rate and choke position) and the central system 114 (e.g. tripping speed). When it is desired to maintain certain downhole pressure during tripping, the coordinated control device 104 may be used to direct the appropriate control commands. Furthermore, for mode based controllers which employ complex computation to reach a control setpoint, which are typically not implemented in the subsystem PLC controllers due to complexity and high computing power demands, the coordinated control device 104 may provide the adequate computing environment for implementing these controllers.

In some embodiments, control of the various systems of the drilling rig 102 may be provided via a multi-tier (e.g., three-tier) control system that includes a first tier of the controllers 126, 132, and 138, a second tier of the coordinated control device 104, and a third tier of the supervisory control system 107. The first tier of the controllers may be responsible for safety critical control operation, or fast loop feedback control. The second tier of the controllers may be responsible for coordinated controls of multiple equipment or subsystems, and/or responsible for complex model based controllers. The third tier of the controllers may be responsible for high level task planning, such as to command the rig system to maintain certain bottom hole pressure. In other embodiments, coordinated control may be provided by one or more controllers of one or more of the drilling rig systems 110, 112, and 114 without the use of a coordinated control device 104. In such embodiments, the rig computing resource environment 105 may provide control processes directly to these controllers for coordinated control. For example, in some embodiments, the controllers 126 and the controllers 132 may be used for coordinated control of multiple systems of the drilling rig 102.

The sensor data 140, 142, and 144 may be received by the coordinated control device 104 and used for control of the drilling rig 102 and the drilling rig systems 110, 112, and 114. In some embodiments, the sensor data 140, 142, and 144 may be encrypted to produce encrypted sensor data 146. For example, in some embodiments, the rig computing resource environment 105 may encrypt sensor data from different types of sensors and systems to produce a set of encrypted sensor data 146. Thus, the encrypted sensor data 146 may not be viewable by unauthorized user devices (either offsite or onsite user device) if such devices gain access to one or more networks of the drilling rig 102. The sensor data 140, 142, 144 may include a timestamp and an aligned drilling parameter (e.g., depth) as discussed above. The encrypted sensor data 146 may be sent to the remote computing resource environment 106 via the network 108 and stored as encrypted sensor data 148.

The rig computing resource environment 105 may provide the encrypted sensor data 148 available for viewing and processing offsite, such as via offsite user devices 120. Access to the encrypted sensor data 148 may be restricted via access control implemented in the rig computing resource environment 105. In some embodiments, the encrypted sensor data 148 may be provided in real-time to offsite user devices 120 such that offsite personnel may view real-time status of the drilling rig 102 and provide feedback based on the real-time sensor data. For example, different portions of the encrypted sensor data 146 may be sent to offsite user devices 120. In some embodiments, encrypted sensor data may be decrypted by the rig computing resource environment 105 before transmission or decrypted on an offsite user device after encrypted sensor data is received.

The offsite user device 120 may include a client (e.g., a thin client) configured to display data received from the rig computing resource environment 105 and/or the remote computing resource environment 106. For example, multiple types of thin clients (e.g., devices with display capability and minimal processing capability) may be used for certain functions or for viewing various sensor data.

The rig computing resource environment 105 may include various computing resources used for monitoring and controlling operations such as one or more computers having a processor and a memory. For example, the coordinated control device 104 may include a computer having a processor and memory for processing sensor data, storing sensor data, and issuing control commands responsive to sensor data. As noted above, the coordinated control device 104 may control various operations of the various systems of the drilling rig 102 via analysis of sensor data from one or more drilling rig systems (e.g. 110, 112, 114) to enable coordinated control between each system of the drilling rig 102. The coordinated control device 104 may execute control commands 150 for control of the various systems of the drilling rig 102 (e.g., drilling rig systems 110, 112, 114). The coordinated control device 104 may send control data determined by the execution of the control commands 150 to one or more systems of the drilling rig 102. For example, control data 152 may be sent to the downhole system 110, control data 154 may be sent to the fluid system 112, and control data 154 may be sent to the central system 114. The control data may include, for example, operator commands (e.g., turn on or off a pump, switch on or off a valve, update a physical property setpoint, etc.). In some embodiments, the coordinated control device 104 may include a fast control loop that directly obtains sensor data 140, 142, and 144 and executes, for example, a control algorithm. In some embodiments, the coordinated control device 104 may include a slow control loop that obtains data via the rig computing resource environment 105 to generate control commands.

In some embodiments, the coordinated control device 104 may intermediate between the supervisory control system 107 and the controllers 126, 132, and 138 of the systems 110, 112, and 114. For example, in such embodiments, a supervisory control system 107 may be used to control systems of the drilling rig 102. The supervisory control system 107 may include, for example, devices for entering control commands to perform operations of systems of the drilling rig 102. In some embodiments, the coordinated control device 104 may receive commands from the supervisory control system 107, process the commands according to a rule (e.g., an algorithm based upon the laws of physics for drilling operations), and/or control processes received from the rig computing resource environment 105, and provides control data to one or more systems of the drilling rig 102. In some embodiments, the supervisory control system 107 may be provided by and/or controlled by a third party. In such embodiments, the coordinated control device 104 may coordinate control between discrete supervisory control systems and the systems 110, 112, and 114 while using control commands that may be optimized from the sensor data received from the systems 110 112, and 114 and analyzed via the rig computing resource environment 105.

The rig computing resource environment 105 may include a monitoring process 141 that may use sensor data to determine information about the drilling rig 102. For example, in some embodiments the monitoring process 141 may determine a drilling state, equipment health, system health, a maintenance schedule, or any combination thereof. Furthermore, the monitoring process 141 may monitor sensor data and determine the quality of one or a plurality of sensor data. In some embodiments, the rig computing resource environment 105 may include control processes 143 that may use the sensor data 146 to optimize drilling operations, such as, for example, the control of drilling equipment to improve drilling efficiency, equipment reliability, and the like. For example, in some embodiments the acquired sensor data may be used to derive a noise cancellation scheme to improve electromagnetic and mud pulse telemetry signal processing. The control processes 143 may be implemented via, for example, a control algorithm, a computer program, firmware, or other suitable hardware and/or software. In some embodiments, the remote computing resource environment 106 may include a control process 145 that may be provided to the rig computing resource environment 105.

The rig computing resource environment 105 may include various computing resources, such as, for example, a single computer or multiple computers. In some embodiments, the rig computing resource environment 105 may include a virtual computer system and a virtual database or other virtual structure for collected data. The virtual computer system and virtual database may include one or more resource interfaces (e.g., web interfaces) that enable the submission of application programming interface (API) calls to the various resources through a request. In addition, each of the resources may include one or more resource interfaces that enable the resources to access each other (e.g., to enable a virtual computer system of the computing resource environment to store data in or retrieve data from the database or other structure for collected data).

The virtual computer system may include a collection of computing resources configured to instantiate virtual machine instances. The virtual computing system and/or computers may provide a human-machine interface through which a user may interface with the virtual computer system via the offsite user device or, in some embodiments, the onsite user device. In some embodiments, other computer systems or computer system services may be utilized in the rig computing resource environment 105, such as a computer system or computer system service that provisions computing resources on dedicated or shared computers/servers and/or other physical devices. In some embodiments, the rig computing resource environment 105 may include a single server (in a discrete hardware component or as a virtual server) or multiple servers (e.g., web servers, application servers, or other servers). The servers may be, for example, computers arranged in any physical and/or virtual configuration In some embodiments, the rig computing resource environment 105 may include a database that may be a collection of computing resources that run one or more data collections. Such data collections may be operated and managed by utilizing API calls. The data collections, such as sensor data, may be made available to other resources in the rig computing resource environment or to user devices (e.g., onsite user device 118 and/or offsite user device 120) accessing the rig computing resource environment 105. In some embodiments, the remote computing resource environment 106 may include similar computing resources to those described above, such as a single computer or multiple computers (in discrete hardware components or virtual computer systems).

Clamp-to-FASTLOCK® Converter

Figure 3:
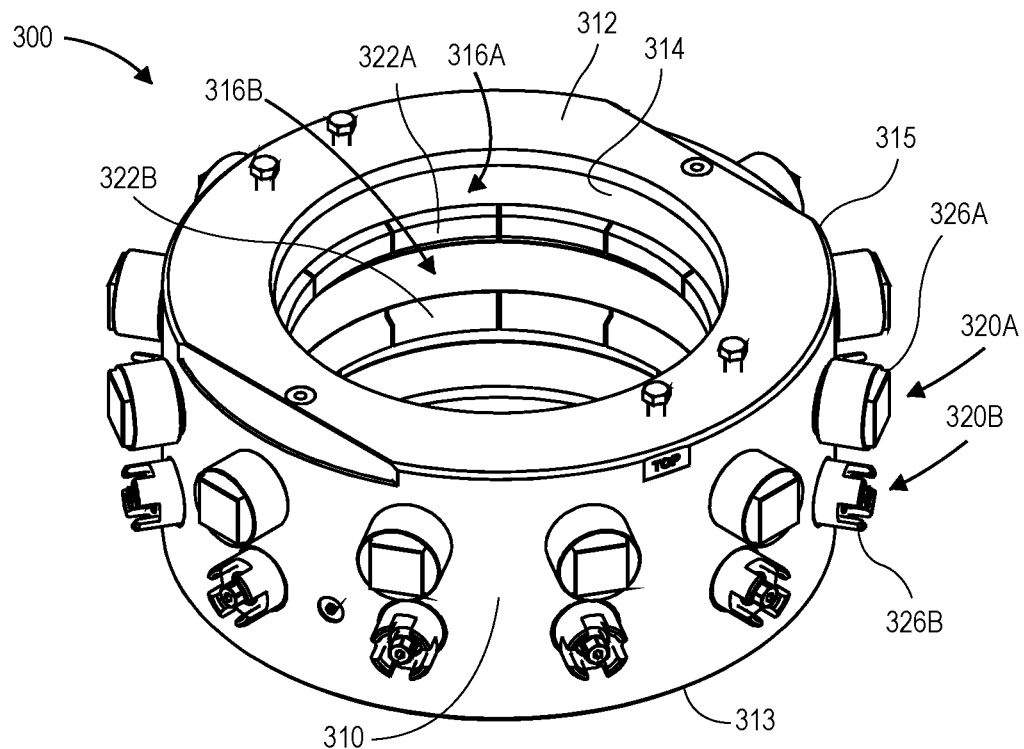
FIG. 3 illustrates a perspective view of a clamp (also referred to as a clamp-to-FASTLOCK® converter or a double row FASTLOCK®), according to an embodiment.

FIG. 3 illustrates a perspective view of a clamp (also referred to as a clamp-to-FASTLOCK® converter or a double row FASTLOCK®) 300, according to an embodiment. The clamp 300 may be used to couple two hubs together on the drilling rig 102. For example, the clamp 300 may be used to couple two hubs together in a wellhead system, a manifold system, and/or a blowout preventer (BOP) system. The coupling of the hubs may be performed manually and/or by the control system 100.

The clamp 300 may include an annular body 310. The body 310 may include a first (e.g., upper) surface 312 and a second (e.g., lower) surface 313. The body 310 may also include an inner (e.g., radial) surface 314 and an outer (e.g., radial) surface 315. The inner surface 314 may define one or more annular recesses (two are shown: 316A, 316B). The first (e.g., upper) recess 316A may be axially offset from (e.g., above) the second (e.g., lower) recess 316B with respect to a central longitudinal axis 311 through the body 310. The recesses 316A, 316B may extend at least partially radially through the body 310, from the inner surface 314 to the outer surface 315.

The clamp 300 may also include one or more sets of clamping segments (two are shown: 320A, 320B). The first (e.g., upper) set of clamping segments 320A may be positioned at least partially within the upper recess 316A, and the second (e.g., lower) set of clamping segments 320B may be positioned at least partially within the lower recess 316B. The upper set may include a plurality (e.g., six) clamping segments 320A that are circumferentially offset from one another, and the lower set may include a plurality (e.g., six) clamping segments 320B that are circumferentially offset from one another.

Figure 4:
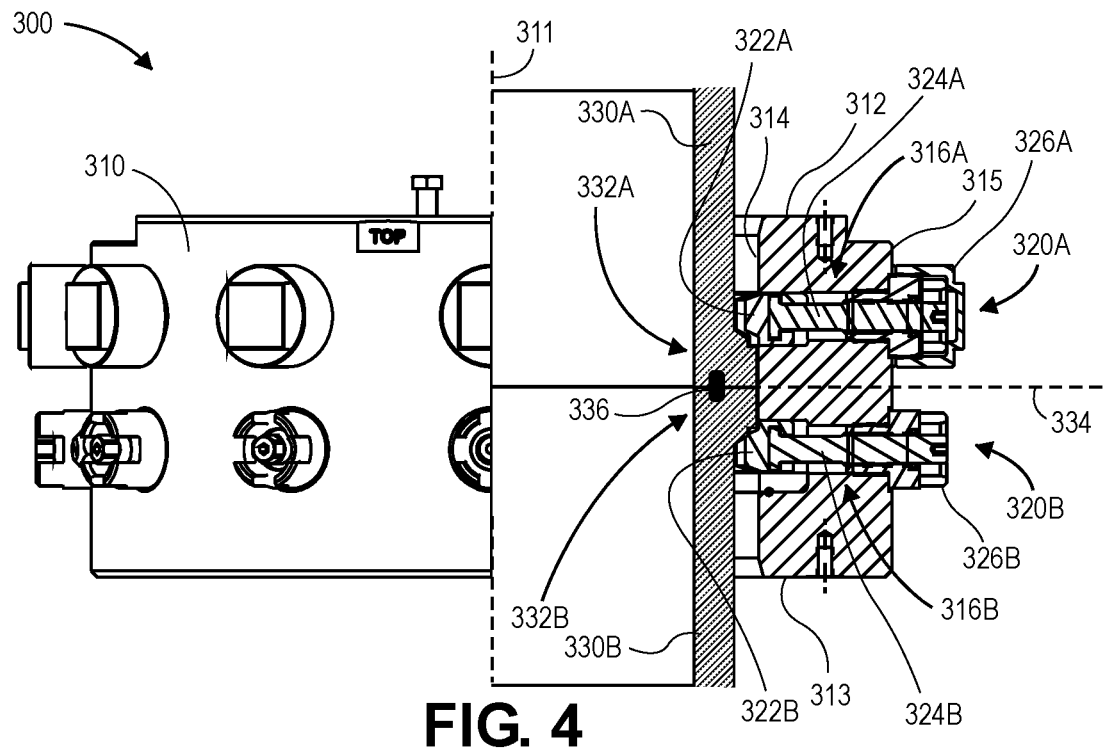
FIG. 4 illustrates a half-sectional side view of the clamp positioned around tubular members, according to an embodiment.

FIG. 4 illustrates a half-sectional side view of the clamp 300 positioned around tubular members 330A, 330B, according to an embodiment. Each clamping segment 320A, 320B may include a first (e.g., inner) end 322A, 322B, a shaft 324A, 324B, and a second (e.g., outer) end 326A, 326B. The inner ends 322A of the upper clamping segments 320A may be positioned at least partially in the recesses 316A and configured to contact a first (e.g., upper) hub 332A of the first (e.g., upper) tubular member 330A. The hub 332A may be oriented at an angle with respect to the central longitudinal axis 311 that is from about 20 degrees to about 70 degrees, about 30 degrees to about 60 degrees, or about 40 degrees to about 50 degrees.

Similarly, the inner ends 322B of the lower clamping segments 320B may be positioned at least partially in the recesses 316B and configured to contact a second (e.g., lower) hub 332B of the second (e.g., lower) tubular member 330B. The hub 332B may be oriented at an angle with respect to the central longitudinal axis 311 that is from about 20 degrees to about 90 degrees, about 30 degrees to about 80 degrees, or about 40 degrees to about 70 degrees. The hubs 332A, 332B may be symmetric with respect to a plane 333 that is perpendicular to the axis 311.

The shafts 324A, 324B may extend radially through the body 310, from the inner surface 314 to the outer surface 315. The shafts 324A, 324B may be coupled to or integral with the inner ends 322A, 322B and the outer ends 326A, 326B.

The outer ends 326A, 326B may be positioned proximate to the outer surface 315 of the body 310. The outer ends 326A, 326B may be configured to be engaged by a tool, which may rotate the outer ends 326A, 326B and the shafts 324A, 324B.

Figure 5:
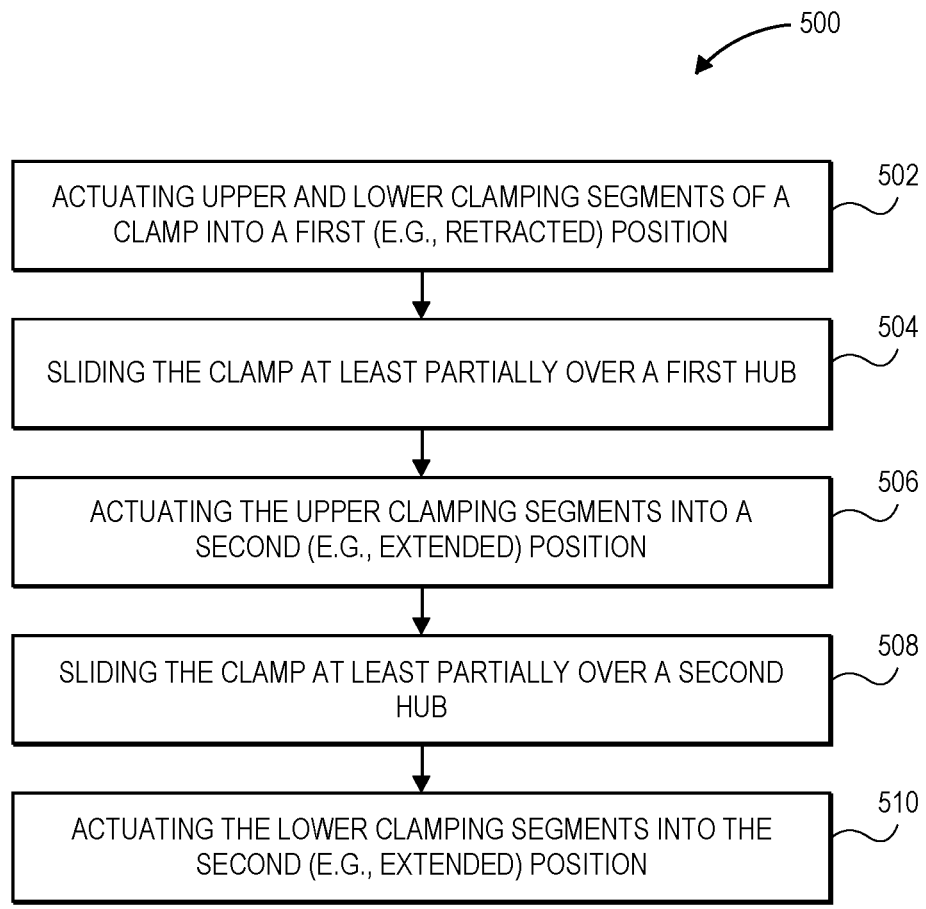
FIG. 5 illustrates a flowchart of a method for coupling two tubular members together using the clamp, according to an embodiment.

FIG. 5 illustrates a flowchart of a method 500 for coupling two tubular members 330A, 330B (e.g., two hubs 332A, 332B) together, according to an embodiment. An illustrative order of the method 500 is provided below, however, one or more aspects of the method 500 may be performed in a different order, combined, split, repeated, or omitted.

The method 500 may include actuating the clamping segments 320A, 320B into a first (e.g., retracted) position, as at 502. This may include engaging the outer ends 326A, 326B with one or more tools, and rotating the outer ends 326A, 326B in a first (e.g., counterclockwise) direction. The rotation may be done manually and/or by the control system 100. The rotation may be done simultaneously (e.g., by a plurality of tools) or sequentially (e.g., by one tool). This may cause the shafts 324A, 324B to rotate within the body 310, which may move the clamping segments 320A, 320B radially outward into the retracted position. Each pair of circumferentially adjacent inner ends 322A, 322B may have a gap positioned therebetween when the clamping segments 320A, 320B are in the retracted position. The inner ends 322A, 322B may be positioned at least partially (e.g., fully) within the recesses 316A, 316B when the clamping segments 320A, 320B are in the retracted position such that an inner diameter of the clamping segments 320A, 320B is greater than or equal to an inner diameter of the body 310. This may allow the clamp 300 to slide over the hubs 332A, 332B.

The method 500 may also include sliding the clamp 300 at least partially over the first hub 332A, as at 504. More particularly, this may include sliding the first end 312 of the clamp 300 at least partially over the first hub 332A.

The method 500 may also include actuating the upper clamping segments 320A into a second (e.g., extended) position, as at 506. This may include engaging the outer ends 326A with the one or more tools, and rotating the outer ends 326A in a second (e.g., clockwise) direction. The rotation may be done manually and/or by the control system 100. The rotation may be done simultaneously (e.g., by a plurality of tools) or sequentially (e.g., by one tool). This may cause the shafts 324A to rotate within the body 310, which may move the clamping segments 320A radially inward into the extended position. The inner ends 322A may contact the hub 332A of the first tubular member 330A when the clamping segments 320A are in the extended position. In one embodiment, each pair of circumferentially adjacent inner ends 322A, 322B may have a gap positioned therebetween when the clamping segments 320A, 320B are in the extended position. In another embodiment, each pair of circumferentially adjacent inner ends 322A, 322B may be in contact with one another (i.e., there may be no gap positioned therebetween) when the clamping segments 320A, 320B are in the extended position The method 500 may also include sliding the clamp 300 at least partially over the second hub 332B, as at 508. More particularly, this may include sliding the second end 313 of the clamp 300 at last partially over the second hub 332B. In another embodiment, the second hub 332B may also or instead be inserted into at least partially into the second end 313 of the clamp 300.

The method 500 may also include actuating the lower clamping segments 320B into the second (e.g., extended) position, as at 510. This may include engaging the outer ends 326B with the one or more tools, and rotating the outer ends 326B in the second (e.g., clockwise) direction. The rotation may be done manually and/or by the control system 100. The rotation may be done simultaneously (e.g., by a plurality of tools) or sequentially (e.g., by one tool). This may cause the shafts 324B to rotate within the body 310, which may move the clamping segments 320B radially inward into the extended position. The inner ends 322B may contact the hub 332B of the second tubular member 330B when the clamping segments 320B are in the extended position.

At this point, the hubs 332A, 332B are positioned axially between the clamping segments 320A, 320B. Due to the angled orientation of the hubs 332A, 332B, the radially inward force exerted on the hubs 332A, 332B by the clamping segments 320A, 320B may also exert opposing axial forces on the hubs 332A, 332B that pushes the hubs 332A, 332B axially together. More particularly, the upper clamping segments 320A may exert a radial inward force and an axial downward force on the hub 332A, and the lower clamping segments 320B may exert a radial inward force and an axial upward force on the hub 332B. This may couple the tubular members 330A, 330B together. This may also squeeze a ring gasket 336 between the hubs 332A, 332B. The clamping segments 320A, 320B may use less force than conventional clamps. As a result, the coupling of the tubular members 330A, 330B may be performed faster than conventional methods.

Figure 6:
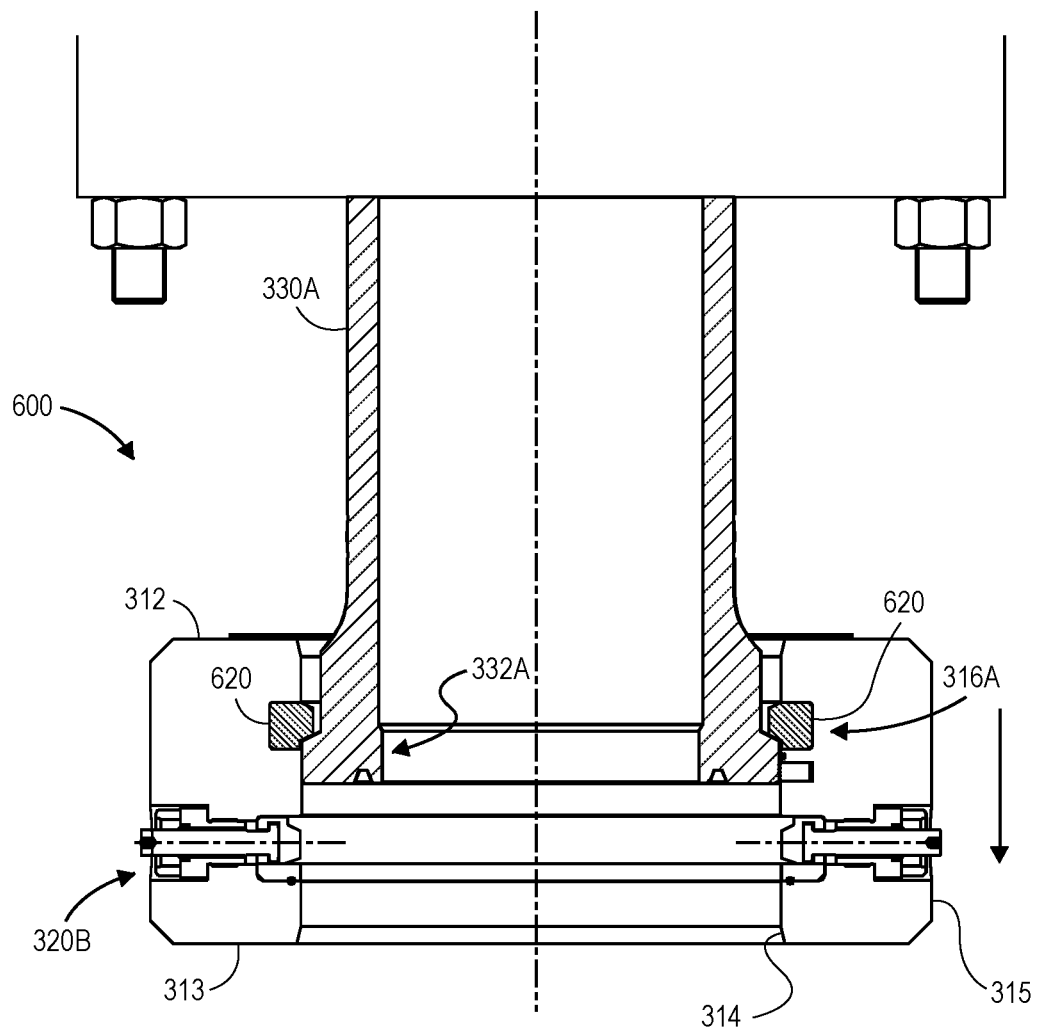
FIG. 6 illustrates a cross-sectional side view of another clamp including a set of fixed segments, according to an embodiment.

FIG. 6 illustrates a cross-sectional side view of another clamp 600 with the first set of retractable clamping segments 320A replaced by a set of fixed set of clamping segments 620, according to an embodiment. The set may include a plurality (e.g., six) fixed segments 620 that are circumferentially offset from one another. The fixed segments 620 may be configured to be inserted at least partially into the upper recess 316A. Unlike the clamping segments 320A, the fixed segments 620 may not extend radially through the body 310, from the inner surface 314 to the outer surface 315. In addition, unlike the clamping segments 320A, the fixed segments 620 may not be configured to actuate between the retracted and extended positions.

Figure 7:
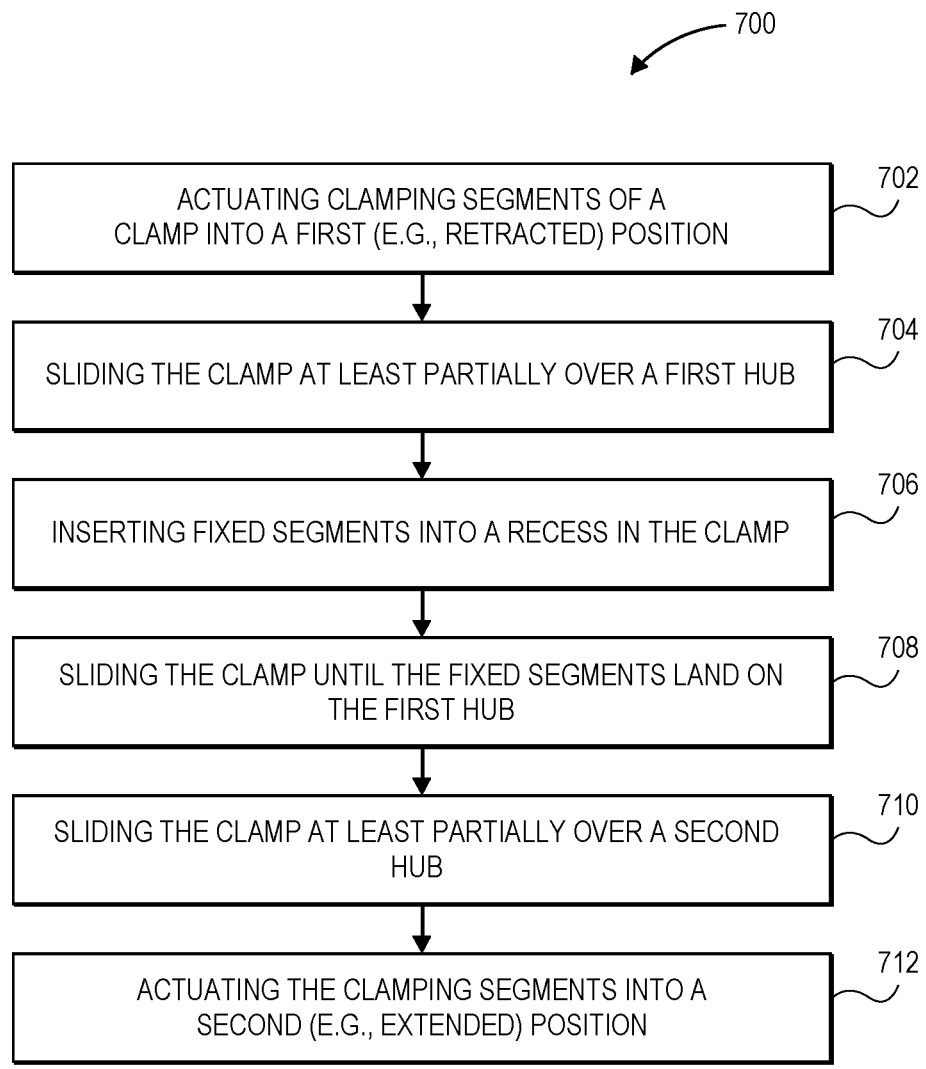
FIG. 7 illustrates a flowchart of a method for coupling two tubular members together using the clamp shown in FIG. 6, according to an embodiment.

FIG. 7 illustrates a flowchart of a method 700 for coupling two tubular members 330A, 330B (e.g., two hubs 332A, 332B) together, according to an embodiment. An illustrative order of the method 700 is provided below, however, one or more aspects of the method 700 may be performed in a different order, combined, split, repeated, or omitted.

The method 700 may include actuating the clamping segments 320B into a first (e.g., retracted) position, as at 702. This is described above. This is also shown in FIG. 6.

The method 700 may also include sliding the clamp 600 at least partially over the first hub 332A, as at 704. More particularly, this may include sliding the first end 312 of the clamp 600 in a first (e.g., upward) direction at least partially over the first hub 332A. The first end 312 may be positioned axially adjacent to a reduced outer diameter portion (e.g., the neck) 334A of the first tubular member 330A. In one embodiment, at this point, the second end 313 may also be positioned at least partially around the first tubular member 330A (e.g., the first hub 332A).

Figure 8:
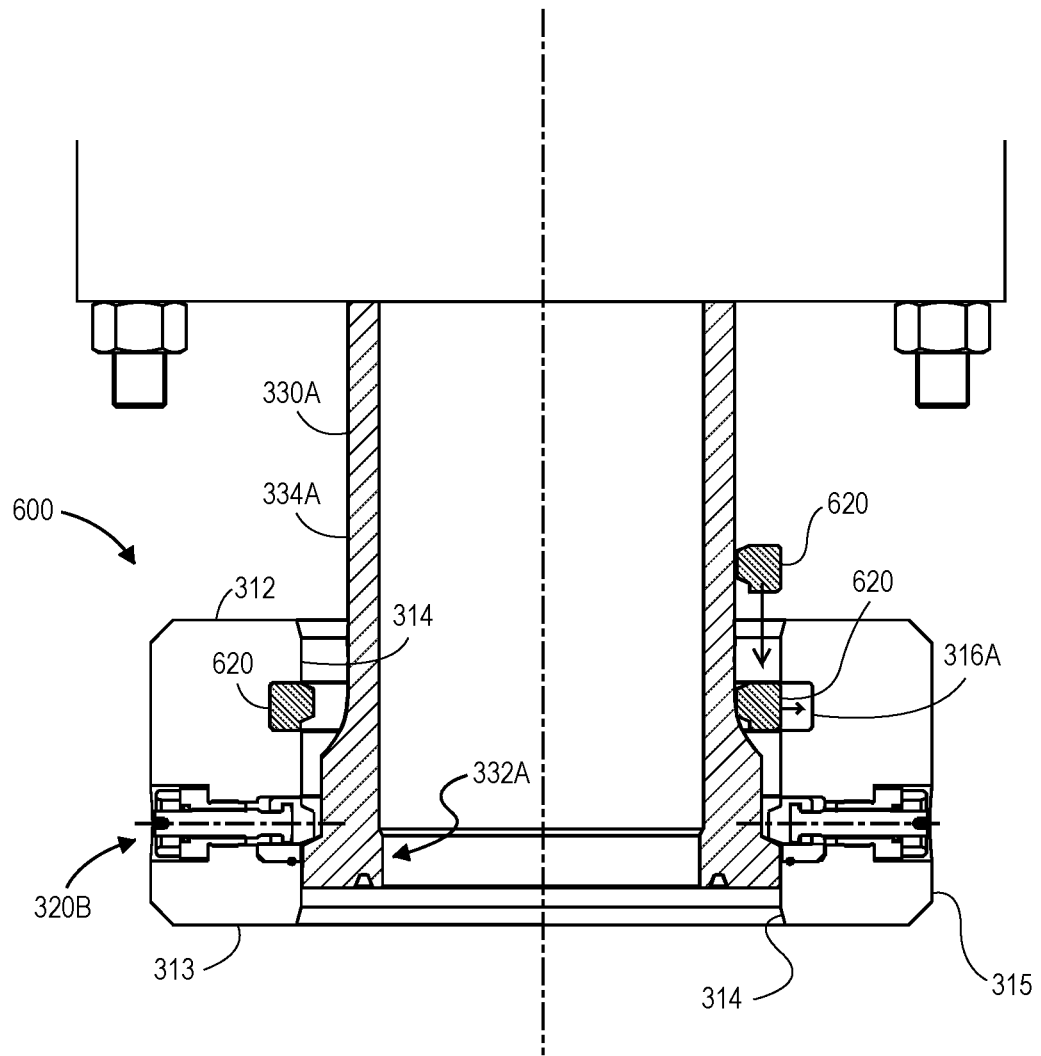
FIG. 8 illustrates a cross-sectional side view of the clamp shown in FIG. 6 with the fixed segments being inserted at least partially into a recess in the clamp, according to an embodiment.

The method 700 may also include inserting the fixed segments 620 into the upper recess 316A, as at 706. The radial gap between the inner surface 314 of the body 310 and the reduced inner diameter portion 334A of the first tubular member 330A may allow a path for the fixed segments 620 to be inserted into the recess 316A. The insertion is shown in FIG. 8. More particularly, on the right side of FIG. 8, the arrows show the fixed segment 620 being inserted by moving it downward and then radially outward into the recess 316A. On the left side of FIG. 8, the fixed segment 620 is shown positioned in the recess 316A.

The method 700 may also include sliding the clamp 600 until the fixed segments 620 land on the first hub 332A, as at 708. This may include sliding the clamp 600 and the fixed segments 620 in a second (e.g., downward) direction with respect to the first tubular member 330A until the fixed segments 620 land on the first hub 332A. The fixed segments 620 may now be secured radially and/or axially between the clamp 600 and the first hub 332A (e.g., within the recess 316A).

The method 700 may also include sliding the clamp 600 at least partially over the second hub 332B, as at 710. More particularly, this may include sliding the second end 313 of the clamp 600 in the second (e.g., downward) direction at least partially over the second hub 332B. In another embodiment, the second hub 332B may also or instead be inserted into at least partially into the second end 313 of the clamp 600.

The method 700 may also include actuating the lower clamping segments 320B into the second (e.g., extended) position, as at 712. This is described above.

At this point, the hubs 332A, 332B are positioned axially between the segments 620, 320B. Due to the angled orientation of the hubs 332A, 332B, the radially inward force exerted on the hubs 332A, 332B by the segments 620, 320B may also exert opposing axial forces on the hubs 332A, 332B that pushes the hubs 332A, 332B together. More particularly, the fixed segments 620 may exert a radial inward force and an axial downward force on the hub 332A, and the clamping segments 320B may exert a radial inward force and an axial upward force on the hub 332B. This may couple the hubs 332A, 332B together. The fixed segments 620 and/or the clamping segments 320B may use less force than conventional clamps. As a result, the coupling of the hubs 332A, 332B may be done faster than conventional methods.

Figure 9:
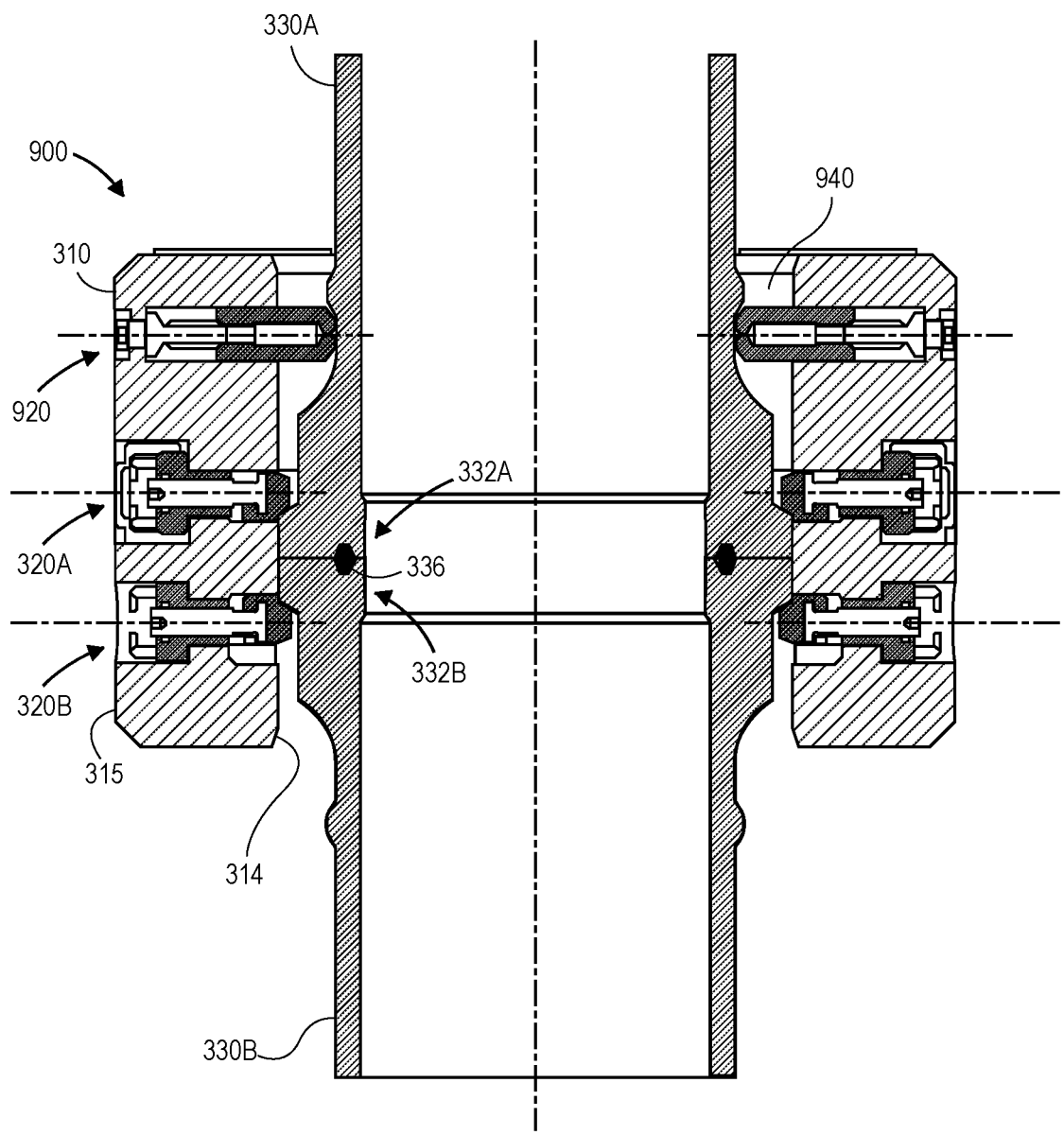
FIG. 9 illustrates a cross-sectional side view of another clamp including a set of gripping segments, according to an embodiment.

FIG. 9 illustrates a cross-sectional side view of another clamp 900 with a set of gripping segments 920, according to an embodiment. The clamp 900 may be similar to the clamp 300; however, the clamp 900 may additionally include a set of gripping segments (or gripping features) 920 positioned above the clamping segments 320A, 320B. In another embodiment, the gripping segments 920 may also or instead be positioned at any position (e.g., between the clamping segments 320A, 320B and/or below the clamping segments 320A, 320B).

The gripping function can be achieved by a variety of systems that can be inboard of clamp or outboard of the clamp (i.e., installed afterwards). The gripping function may fix (e.g., couple) definitely or temporarily the clamp to one of the two hubs 332A, 332B. The gripping function may simplify operations because once the clamp is installed, one row of retractable segment is used to make-up the connection. A non-exhaustive list of gripping features that can be used to achieve the gripping function may include actuated gripping segments, set screws, add-on securing clamp, gripping wedges, retainer ring. The gripping features can withstand dynamic re-entry loads and/or storage loads.

The set may include a plurality (e.g., six) gripping segments 920 that are circumferentially offset from one another. The gripping segments 920 may extend radially through the body 310, from the inner surface 314 to the outer surface 315. In addition, the clamp 900 may include a seal (e.g., a top trash seal) 940 above the gripping segments 920 and radially between the clamp 900 and the tubular member 330A. The seal 940 may protect the mechanism from environmental pollution, contamination or induced corrosion.

Figure 10:
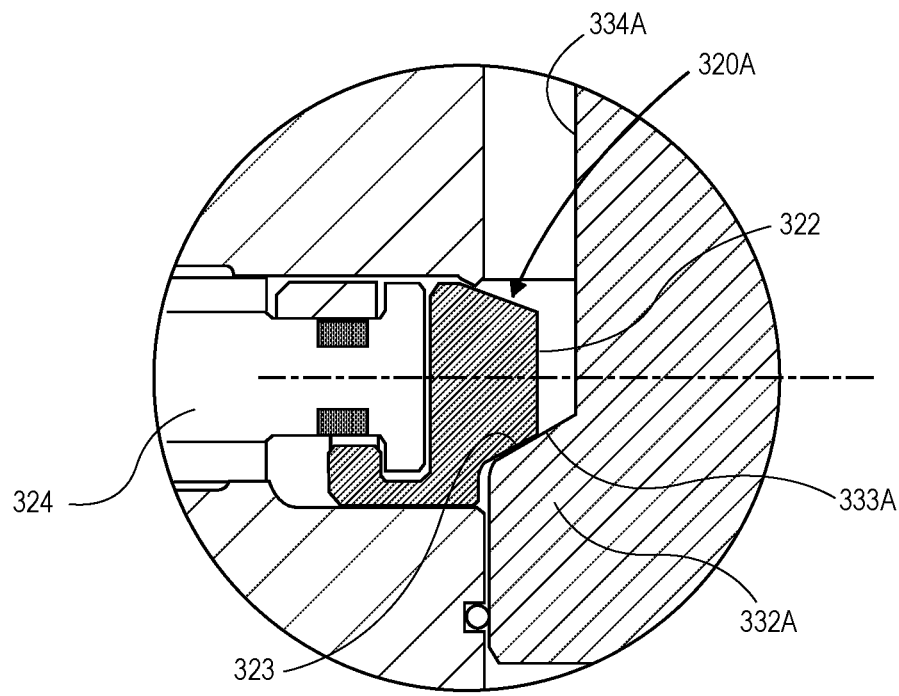
FIG. 10 illustrates a cross-sectional side view of a portion of a clamping segment of the clamp shown in FIG. 9, according to an embodiment.

FIG. 10 illustrates a cross-sectional side view of a portion of the clamping segment 320A, according to an embodiment. The inner end 322 may be configured to contact the hub 332A. More particularly, the inner end 322 may include a tapered (e.g., beveled) surface 323 that is configured to contact a corresponding tapered surface 333A of the hub 332A. The surfaces 323, 333A may be oriented at the angle discussed above (e.g., from about 20 degrees to about 90 degrees with respect to the axis 311). In an embodiment, the inner end 322 may not be configured to contact the neck 334A such that a radial gap is defined therebetween.

Figure 11:
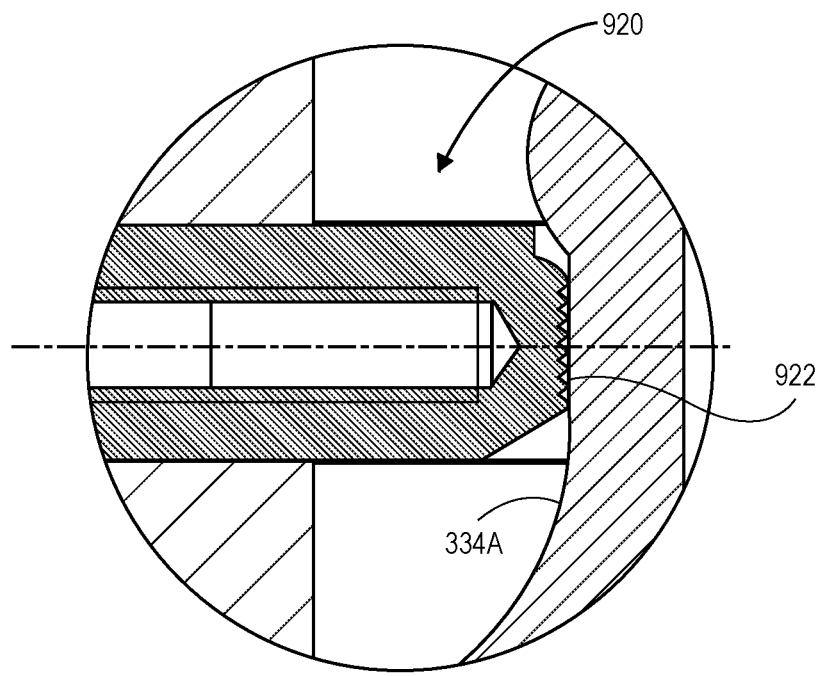
FIG. 11 illustrates a cross-sectional side view of a portion of a gripping segment of the clamp shown in FIG. 9, according to an embodiment.

FIG. 11 illustrates a cross-sectional side view of a portion of the gripping segment 920, according to an embodiment. The inner surface 922 of the gripping segment 920 may include a plurality of teeth that are configured to grip (e.g., bite into) the tubular member 330A. For example, the gripping segment 920 may be configured to grip the hub 332A and/or the neck 334A of the tubular member 330A. The gripping segments 920 exert a radially inward gripping force on the tubular member 330A that prevents the tubular member 330A from moving axially (e.g., up and down) with respect to the gripping members 920, and also prevents the tubular member 330A from rotating.

Figure 12:
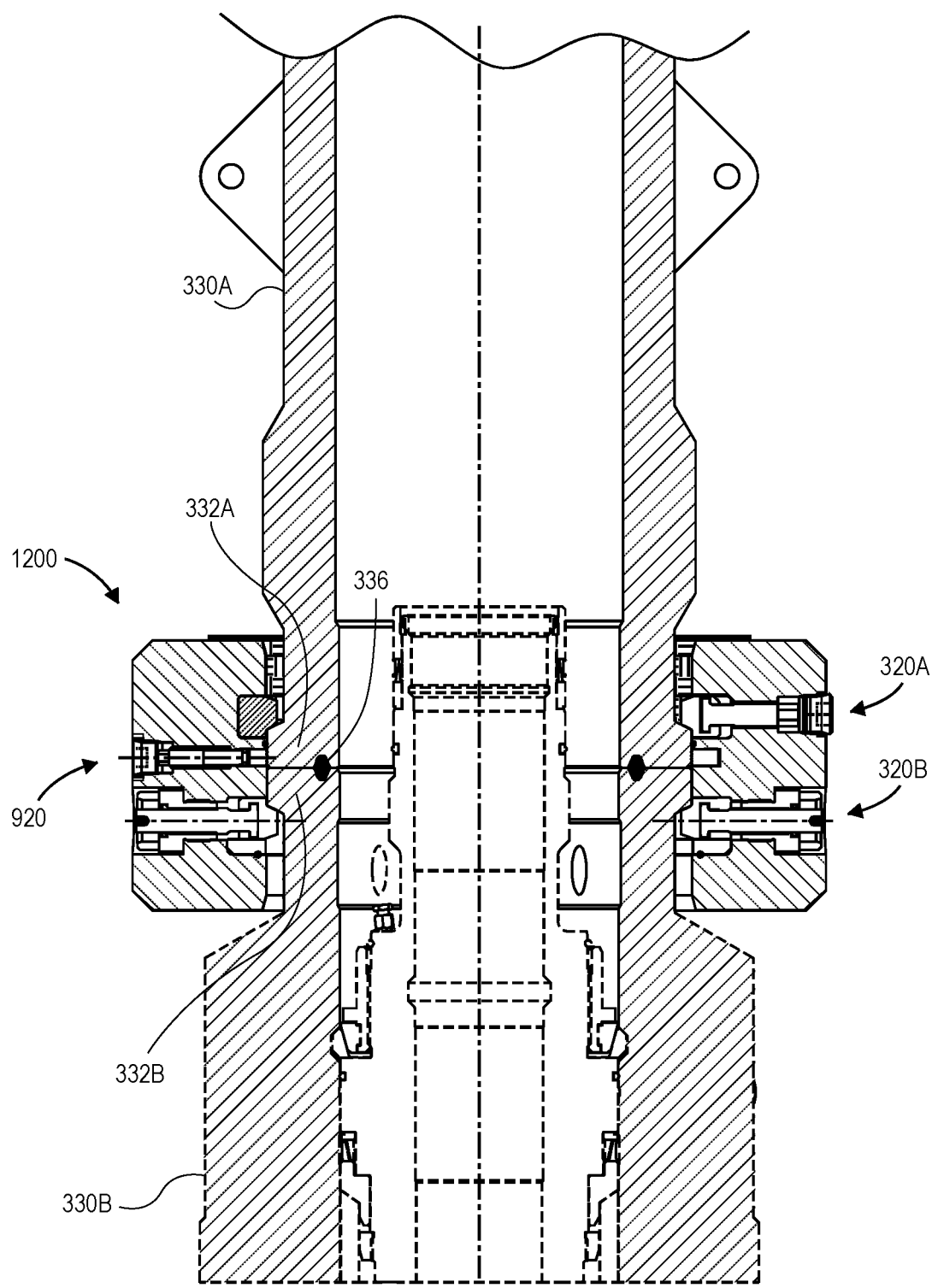
FIG. 12 illustrates a cross-sectional side view of another clamp including the clamping segments and the gripping segments, according to an embodiment.

FIG. 12 illustrates a cross-sectional side view of another clamp 1200 including the clamping segments 320A, 320B and the gripping segments 920, according to an embodiment. The upper clamping segments 320A may be configured to be tightened against the upper hub 332A, and the lower clamping segments 320B may be configured to be tightened against the lower hub 332B. In this embodiment, the gripping segments 920 are positioned between the clamping segments 320A, 320B, and the gripping segments 920 are configured to grip the upper hub 332A. The upper tubular member 330A may be part of or coupled to a riser adapter, and the lower tubular member 330B may be part of or coupled to a wellhead.

Figure 13:
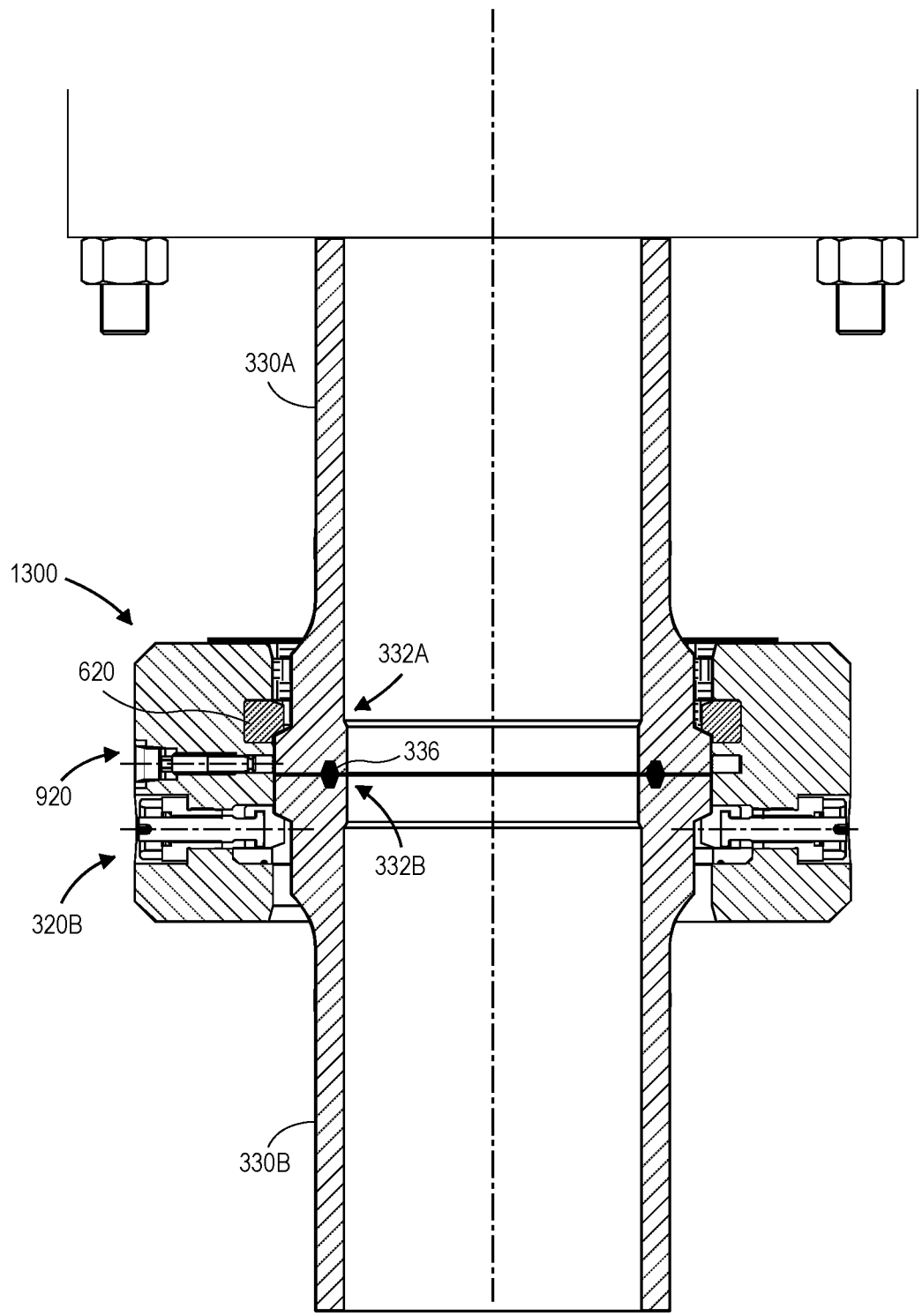
FIG. 13 illustrates a cross-sectional side view of another clamp including the clamping segments, the fixed segments, and the gripping segments, according to an embodiment.

FIG. 13 illustrates a cross-sectional side view of another clamp 1300 including the clamping segments 320B, the fixed segments 620, and the gripping segments 920, according to an embodiment. The fixed segments 620 may be configured to contact (e.g., land on) the upper hub 332A, and the clamping segments 320B may be configured to be tightened against the lower hub 332B. In this embodiment, the gripping segments 920 are positioned between the fixed segments 620 and the clamping segments 320B, and the gripping segments 920 are configured to grip the upper hub 332A.

Figure 14:
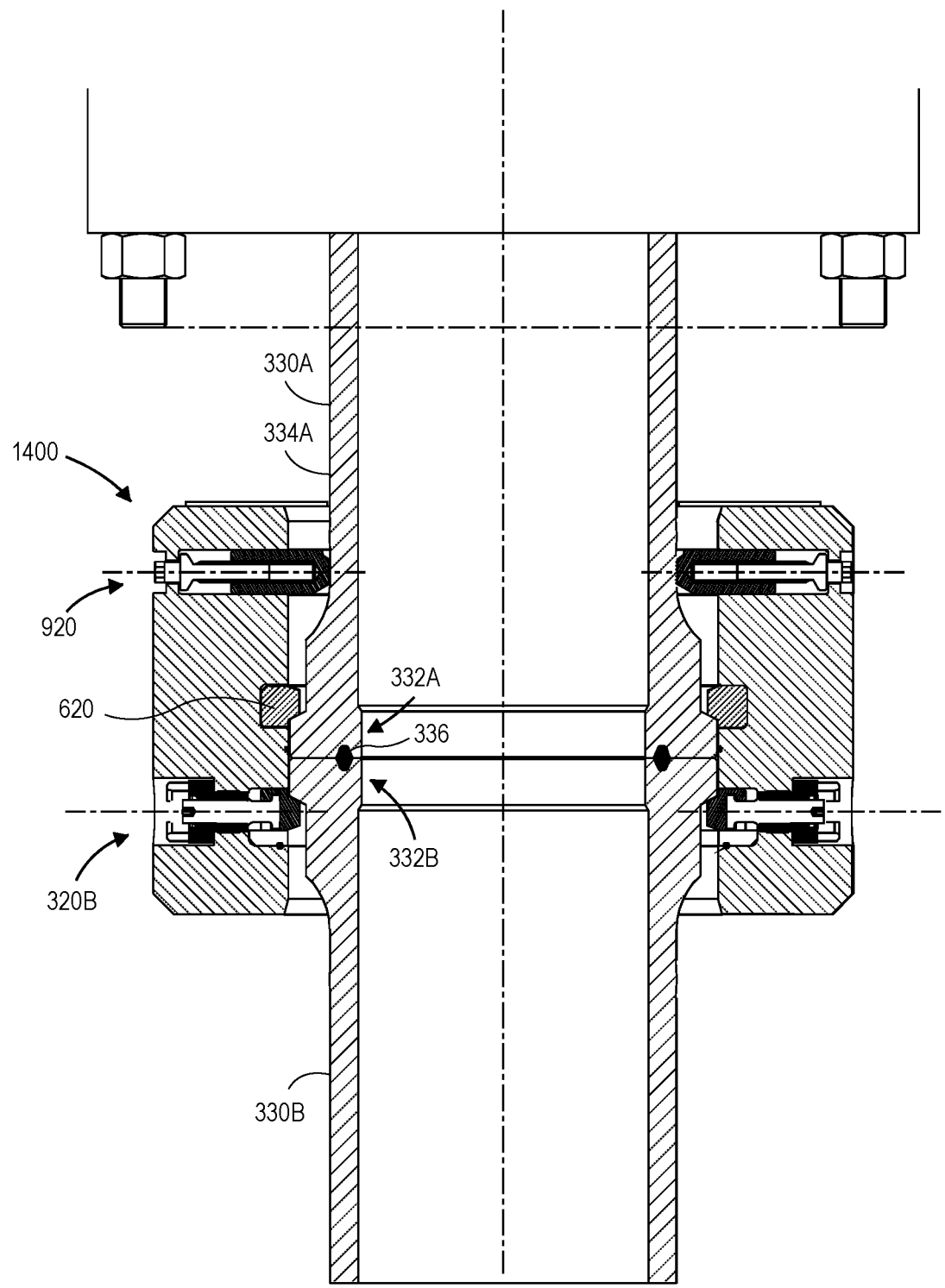
FIG. 14 illustrates a cross-sectional side view of another clamp including the clamping segments, the fixed segments, and the gripping segments, according to an embodiment.

FIG. 14 illustrates a cross-sectional side view of another clamp 1400 including the clamping segments 320B, the fixed segments 620, and the gripping segments 920, according to an embodiment. The fixed segments 620 may be configured to contact (e.g., land on) the upper hub 332A, and the clamping segments 320B may be configured to be tightened against the lower hub 332B. In this embodiment, the gripping segments 920 are positioned above the fixed segments 620 and the clamping segments 320B, and the gripping segments 920 are configured to grip the neck 334A of the upper tubular member 330A, above the upper hub 332A.

Figure 15:
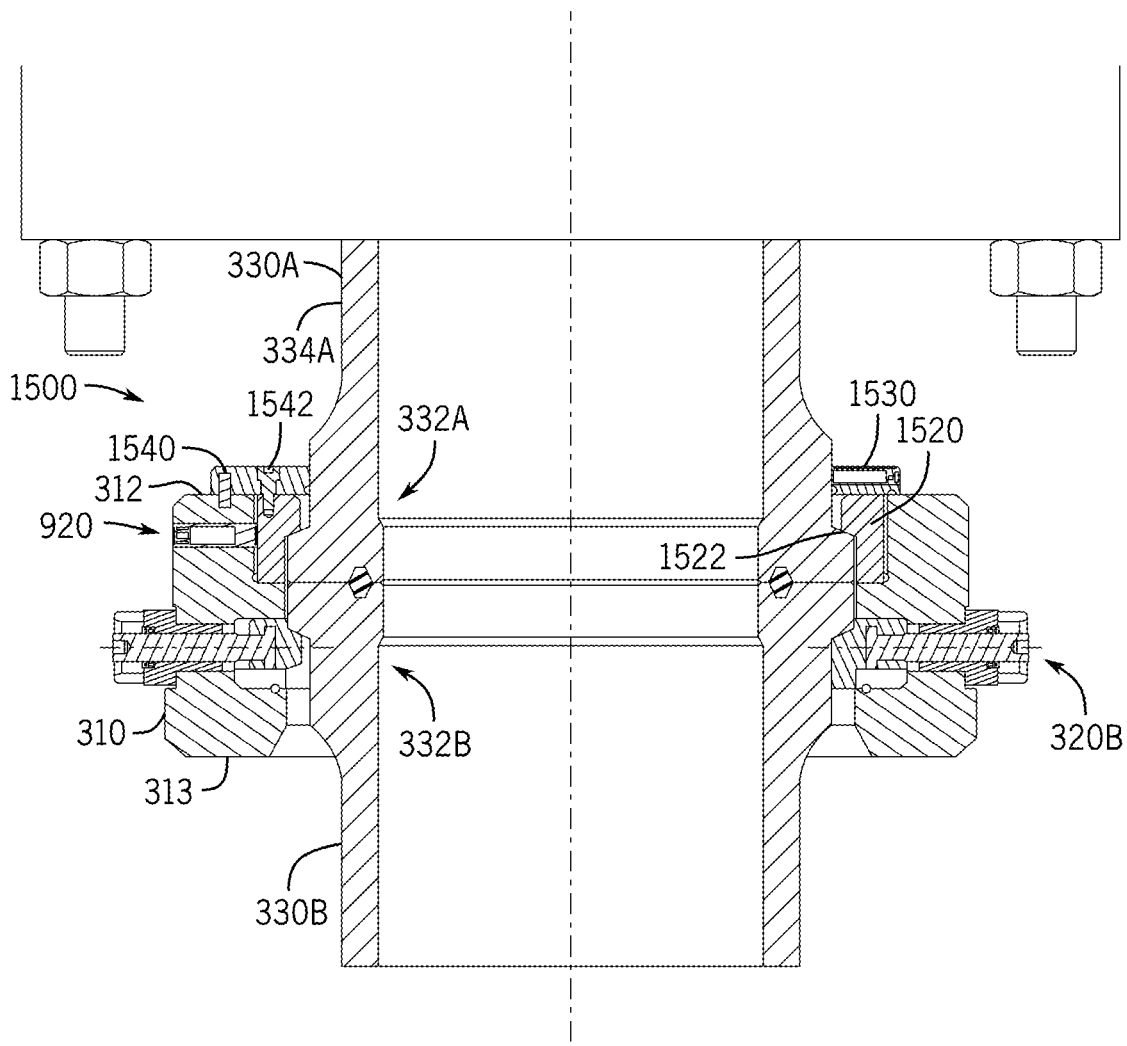
FIG. 15 illustrates a cross-sectional side view of another clamp including a set of segments threaded on the body, according to an embodiment.

FIG. 15 illustrates a cross-sectional side view of another clamp 1500 including the clamping segments 320B and a split ring 1520, according to an embodiment. The split ring 1520 may include two or more portions (e.g., fixed segments 620) that together are configured to wrap around the upper tubular member 330A. For example, the split ring 1520 may include two portions that are each configured to wrap about 180 degrees around the upper hub 332A. The split ring 1520 may be configured to be positioned at least partially in the recess 316A in the body 310. The split ring 1520 may be axially secured to the body 310. The connection between the split ring 1520 and the body 310 may be configured to withstand the axial load applied by the hub(s) 332A, 332B. This connection may be performed via a plurality of features) e.g., threads, intermediate segments, bolting, radial screws etc.). The split ring 1520 may include a tapered inner surface 1522 that is configured to contact (e.g., mate with) the tapered outer surface of the hub 332A.

The clamp 1500 may also include a plate 1530 that is configured to be positioned axially adjacent to the body 310, the split ring 1520, or both. For example, the plate 1530 may be positioned above the body 310 and the split ring 1520. The plate 1530 may include two or more portions that together are configured to wrap around the upper tubular member 330A. For example, the plate 1530 may include two portions that are each configured to wrap about 180 degrees around the neck 334A of the tubular member 330A. In one embodiment, the two portions of the plate 1530 may be rotationally offset with respect to the two portions of the split ring 1520 (e.g., by 90 degrees).

In one embodiment, one or more coupling members (e.g., bolts) 1540 may be configured to couple the body 310 to the plate 1530. In another embodiment, one or more coupling members (e.g., bolts) 1542 may be configured to couple the split ring 1520 to the plate 1530. The gripping segment(s) 920 may extend through the body 310, the split ring 1520, or both. Eventually the gripping function can also be achieved via gripping features positioned into the plate 1530. The gripping feature may, then, be extended inward to bite the back face outer diameter of the hub(s) 332A, 332B.

Figure 16:
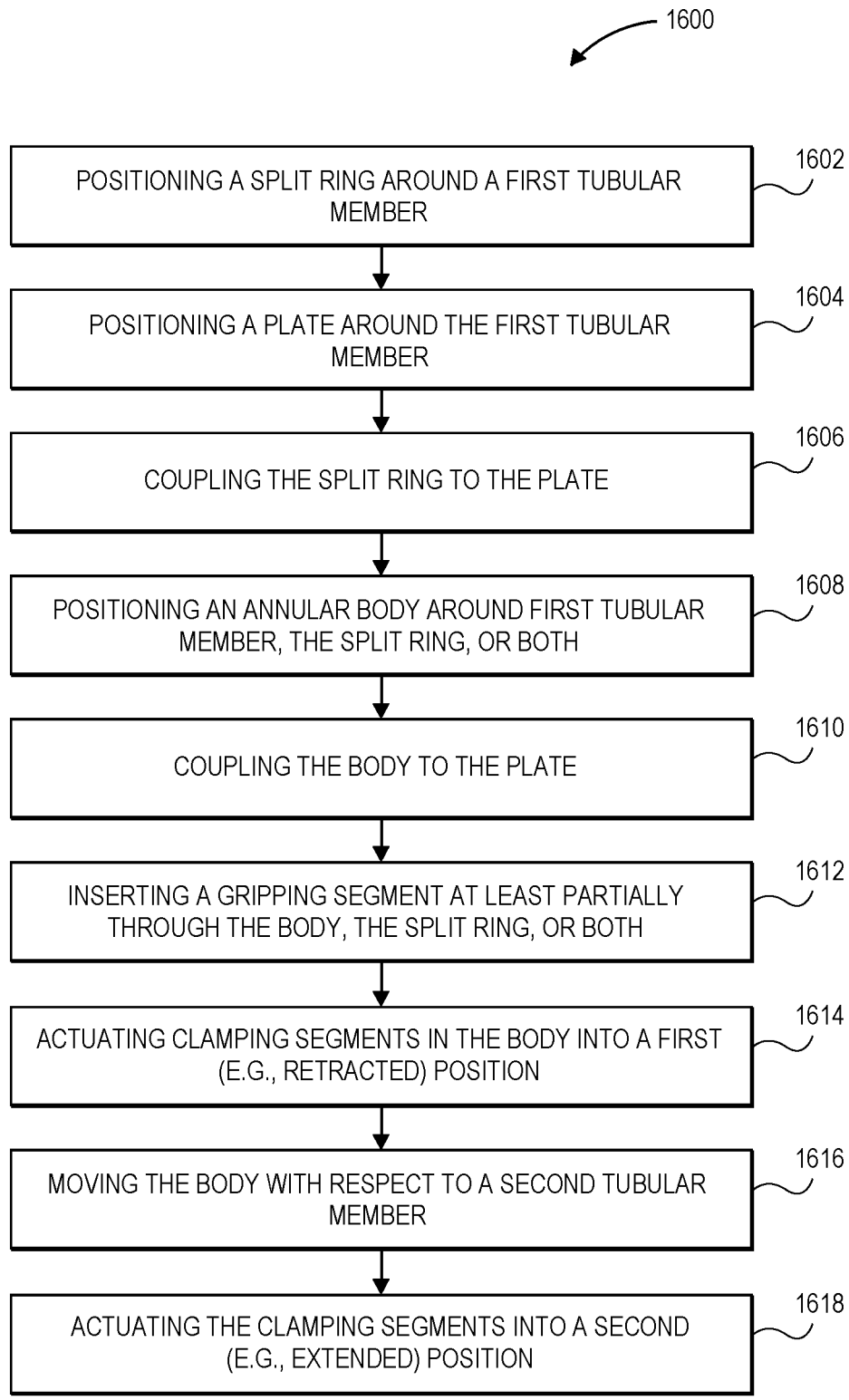
FIG. 16 illustrates a flowchart of a method for coupling two tubular members together using the clamp shown in FIG. 15, according to an embodiment.

FIG. 16 illustrates a flowchart of a method 1600 for coupling two tubular members 330A, 330B (e.g., two hubs 332A, 332B) together, according to an embodiment. An illustrative order of the method 1600 is provided below, however, one or more aspects of the method 1600 may be performed in a different order, combined, split, repeated, or omitted.

The method 1600 may include positioning the split ring 1520 around the first tubular member 330A, as at 1602. This may include positioning a first portion of the split ring 1520 (e.g., a first fixed segment) around a first portion of the circumference of the first hub 332A, and positioning a second portion of the split ring 1520 (e.g., a second fixed segment) around a second portion of the circumference of the first hub 332A.

The method 1600 may also include positioning the plate 1530 around the first tubular member 330A, as at 1604. This may include positioning a first portion of the plate 1530 around a first portion of the circumference of the first tubular member 330A, and positioning a second portion of the plate 1530 around a second portion of the circumference of the first tubular member 330A. As mentioned above, in one embodiment, the portions of the plate 1530 may be rotationally misaligned with the portions of the split ring 1520 (e.g., by degrees).

The method 1600 may also include coupling the split ring 1520 to the plate 1530, as at 1606. For example, the coupling member(s) 1542 may be screwed vertically into aligned holes in the split ring 1520 and the plate 1530.

The method 1600 may also include positioning the body 310 around the upper hub 332A, the split ring 1520, or both, as at 1608. This may include moving the body 310 upward until it is positioned at least partially around the upper hub 332A and the split ring 1520. This may also or instead include rotating the body 310 with respect to the split ring 1520, which may couple the body 310 to the split ring 1520 via corresponding threads on the inner surface of the body 310 and the outer surface of the split ring 1520. Eventually the connection may also or instead include alternative features that may transfer the axial load between the split ring 1520 and the body 310.

The method 1600 may also include coupling the body 310 to the plate 1530, as at 1610. For example, the coupling member(s) 1540 may be screwed vertically into aligned holes in the body 310 and the plate 1530.

The method 1600 may also include inserting the gripping segment(s) 920 at least partially through the body 310, the split ring 1520, or both, as at 1612. In one example, the gripping segment(s) 920 may extend radially through the body 310 and exert a force on the outer surface of the split ring 1520. In another example, the gripping segment(s) 920 may extend radially through the body 310 and the split ring 1520 and exert a force on the outer surface of the hub 332A. The gripping segment(s) 920 may prevent the body 310, the split ring 1520, the plate 1530, or a combination thereof from moving axially and/or rotating with respect to the hub 332A. Once again, the gripping function can be dedicated or combined, and the same function can be achieve by a plurality of mechanical features as described above.

The method 1600 may also include actuating the clamping segments 320B into a first (e.g., retracted) position, as at 1614. This is described above. This may allow the second hub 332B to pass through the clamping segments 320B, as described below.

The method 1600 may also include moving the body 310 with respect to the second tubular member 330B, as at 1616. In one example, this may include lowering the first tubular member 330A, the body 310, the split ring 1520, and the plate 1530 with respect to the second tubular member 330B such that the second hub 332B becomes inserted up into the lower end 313 of the body 310. In another example, this may include raising the second tubular member 330B up into the second end 313 of the body 310, the split ring 1520, or both.

The method 1600 may also include actuating the clamping segments 320B into a second (e.g., extended) position, as at 1618. This is described above.

At this point, the hubs 332A, 332B are positioned axially between the split ring 1520 and the clamping segments 320B. Due to the angled orientation of the hubs 332A, 332B, the radially inward force exerted on the hubs 332A, 332B by the split ring 1520 and the clamping segments 320B may also exert opposing axial forces on the hubs 332A, 332B that pushes the hubs 332A, 332B axially together. More particularly, the split ring 1520 may exert a radial inward force and an axial downward force on the hub 332A, and the clamping segments 320B may exert a radial inward force and an axial upward force on the hub 332B. This may couple the tubular members 330A, 330B together. This may also squeeze the ring gasket 336 between the hubs 332A, 332B. This design may allow the coupling of the tubular members 330A, 330B to be performed faster than conventional methods.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to explain at least some of the principals of the disclosure and their practical applications, to thereby enable others skilled in the art to utilize the disclosed methods and systems and various embodiments with various modifications as are suited to the particular use contemplated.

What is claimed is:

1. A clamp for coupling two tubular members together, the clamp comprising:
    an annular body comprising a first planar surface at a distal end of the annular body;
    a plurality of fixed segments that are configured to be secured at least partially within a recess formed in an inner surface of the annular body, wherein the plurality of fixed segments is circumferentially offset from one another with respect to a central longitudinal axis through the annular body, wherein the plurality of fixed segments is configured to exert a downward force on a first hub of a first tubular member, wherein the plurality of fixed segments together forms a second planar surface at a distal end of the plurality of fixed segments, and wherein each fixed segment of the plurality of fixed segments comprises a first tapered inner surface configured to interface with a second tapered surface of the first hub;
    an annular plate configured to be removably coupled to the first planar surface via one or more coupling members and removably coupled to the second planar surface via one or more additional coupling members, wherein the annular plate comprises a plurality of portions that together extend circumferentially around the annular body and the plurality of fixed segments, wherein the plurality of portions is circumferentially offset from one another with respect to the central longitudinal axis; and
    a plurality of clamping segments, wherein each clamping segment of the plurality of clamping segments comprises:
        a shaft comprising a first end portion and a second end portion, wherein the shaft is configured to extend radially through the annular body;
        an inner end portion configured to couple to the first end portion of the shaft, wherein the inner end portion is further configured to exert an upward force on a second hub of a second tubular to secure the first and second hubs axially between the plurality of fixed segments and the plurality of clamping segments, and wherein the inner end portion comprises a third tapered inner surface configured to interface with a fourth tapered surface of the second hub; and
        an outer end portion configured to couple to the second end portion of the shaft, wherein the outer end portion is configured to drive the shaft to rotate and actuate the clamping segment between a retracted position and an extended position;
    wherein the plurality of clamping segments is circumferentially offset from one another, and
    wherein the plurality of clamping segments is axially offset from the fixed segments.

2. The clamp of claim 1, wherein the plurality of fixed segments is configured to be inserted into the recess when the recess is above the first hub and axially adjacent to a neck of the first tubular member, and wherein the neck has a lesser outer diameter than the first hub.

3. The clamp of claim 1, wherein the plurality of fixed segments forms a split ring that is secured both radially and axially between the annular body and the first tubular member when the plurality of fixed segments contacts the first hub.

4. The clamp of claim 1, wherein the plurality of fixed segments does not extend radially through the annular body to an outer surface of the annular body, and wherein the plurality of fixed segments is not configured to actuate between the retracted and the extended positions.

5. The clamp of claim 1, further comprising a plurality of gripping segments that extends radially through the annular body, wherein the plurality of gripping segments is configured to move radially inward to exert radially inward forces that prevent the annular body from moving axially with respect to the first tubular member, and wherein the plurality of gripping segments is also configured to be reversible such that the gripping segments move radially outward and away from the first tubular member.

6. The clamp of claim 1, further comprising a plurality of gripping segments that extends radially through the annular body, wherein the plurality of gripping segments is configured to move radially inward to provide an anti-rotation force on an outer surface of one or more of the plurality of fixed segments, and wherein the plurality of gripping segments is also configured to be reversible such that the plurality of gripping segments moves radially outward and away from the first tubular member.

7. The clamp of claim 5, wherein the plurality of gripping segments is configured to exert the radially inward forces on an outer surface of one or more of the plurality of fixed segments.

8. A clamp for coupling two tubular members together, the clamp comprising:
    an annular body comprising a first planar surface at a distal end of the annular body;
    a split ring configured to be positioned at least partially within a recess formed in an inner surface of the annular body, wherein the split ring comprises a plurality of fixed segments that is circumferentially offset from one another with respect to a central longitudinal axis through the annular body, wherein the split ring is configured to exert a downward force on a first hub of a first tubular member, wherein the split ring comprises a second planar surface at a distal end of the split ring, and wherein each fixed segment of the plurality of fixed segments comprises a first tapered inner surface configured to interface with a second tapered surface of the first hub;

an annular plate configured to be positioned above the first planar surface of the annular body and the second planar surface of the split ring, wherein the annular plate is configured to be removably coupled to the annular body and the split ring, wherein the annular plate comprises a plurality of portions that extends circumferentially around the annular body and the split ring and is circumferentially offset from one another with respect to the central longitudinal axis, and wherein the plurality of portions of the annular plate is rotationally offset from the plurality of fixed segments; and a plurality of clamping segments, wherein each clamping segment of the plurality of clamping segments comprises:

a shaft comprising a first end portion and a second end portion, wherein the shaft is configured to extend radially through the annular body;

an inner end portion configured to couple to the first end portion of the shaft, wherein the inner end portion is further configured to exert an upward force on a second hub of a second tubular to secure the first and second hubs axially between the plurality of fixed segments and the plurality of clamping segments, and wherein the inner end portion comprises a third tapered inner surface configured to interface with a fourth tapered surface of the second hub; and an outer end portion configured to couple to the second end portion of the shaft, wherein the outer end portion is configured to drive the shaft to rotate and actuate the clamping segment between a retracted position and an extended position;

wherein the plurality of clamping segments is circumferentially offset from one another, and wherein the plurality of clamping segments is axially offset from the split ring.

9. The clamp of claim 8, wherein the annular plate is coupled to the split ring via one or more coupling members that extend through vertically aligned holes in the annular plate and the plurality of fixed segments.

10. The clamp of claim 8, wherein the annular plate is removably coupled to the annular body via one or more coupling members that extend through vertically aligned holes in the annular plate and the annular body.

11. The clamp of claim 8, further comprising a gripping segment that extends radially through the annular body, wherein the gripping segment is axially offset from the plurality of clamping segments, and wherein the gripping segment is configured to provide an anti-rotation force on an outer surface of the split ring.

12. A method for coupling two tubular members together, the method comprising:

positioning a split ring around a first hub of a first tubular member, wherein the split ring comprises a plurality of fixed segments that is circumferentially offset from one another, wherein the split ring comprises a first planar surface at a distal end of the split ring, and wherein each fixed segment of the plurality of fixed segments comprises a first tapered inner surface configured to interface with a second tapered surface of the first hub;

positioning an annular body around the split ring, the first hub, or both, wherein the annular body comprises a second planar surface at a distal end of the annular body;

securing the plurality of fixed segments within the annular body;

removably coupling an annular plate to the first planar surface of the split ring and the second planar surface of the annular body, wherein the annular plate comprises a plurality of portions that is circumferentially offset from one another, wherein the plurality of portions is rotationally offset from the plurality of fixed segments;

actuating a plurality of clamping segments into a retracted position, wherein each clamping segment comprises:

a shaft comprising a first end portion and a second end portion, wherein the shaft is configured to extend radially through the annular body;

an inner end portion configured to couple to the first end portion of the shaft, wherein the inner end portion is further configured to exert an upward force on a second hub of a second tubular member to secure the first and second hubs axially between the plurality of fixed segments and the plurality of clamping segments, and wherein the inner end portion comprises a third tapered inner surface configured to interface with a fourth tapered surface of the second hub; and an outer end portion configured to couple to the second end portion of the shaft, wherein the outer end portion is configured to drive the shaft to rotate and actuate the clamping segment between a retracted position and an extended position;

wherein the plurality of clamping segments is circumferentially offset from one another, and wherein the plurality of clamping segments is axially offset from the split ring;

positioning the annular body around the second hub of a second tubular member; and actuating the plurality of clamping segments into an extended position to contact the second hub, thereby securing the first and second hubs axially between the split ring and the plurality of clamping segments.

13. The method of claim 12, further comprising rotating the annular body with respect to the split ring to couple the annular body and the split ring together via corresponding threads on an outer surface of the split ring and an inner surface of the annular body.

14. The method of claim 12, wherein positioning the annular body around the second hub comprises lowering the annular body, the split ring, and the first tubular member with respect to the second tubular member.

15. The method of claim 12, further comprising inserting a gripping segment radially through the annular body, wherein the gripping segment is configured to provide an anti-rotation force on an outer surface of the split ring.

* * * * *